United States Patent [19]
Yamada et al.

[11] Patent Number: 5,642,344
[45] Date of Patent: Jun. 24, 1997

[54] RECORDING AND/OR REPRODUCING APPARATUS FOR RECORDING MEDIUM AND DAMPER MECHANISM EMPLOYED IN SUCH APPARATUS

[75] Inventors: Tomohiro Yamada, Chiba; Yoshihiko Wakabayashi, Tokyo, both of Japan

[73] Assignee: Sony Corporation, Tokyo, Japan

[21] Appl. No.: 530,866

[22] Filed: Sep. 19, 1995

Related U.S. Application Data

[62] Division of Ser. No. 295,266, Aug. 24, 1994, abandoned.

[30] Foreign Application Priority Data

| Aug. 26, 1993 | [JP] | Japan | 5-234275 |
| Aug. 26, 1993 | [JP] | Japan | 5-234276 |
| Dec. 14, 1993 | [JP] | Japan | 5-313063 |

[51] Int. Cl.$^6$ ............................... G11B 15/675
[52] U.S. Cl. ........................... 369/77.2; 360/96.6
[58] Field of Search ................. 360/96.6, 96.5; 369/13, 77.1, 77.2, 263

[56] References Cited

U.S. PATENT DOCUMENTS

| 2,820,853 | 1/1958 | Dally | 179/100.41 |
| 3,556,537 | 1/1971 | Stacy | 274/23 |
| 4,005,858 | 2/1977 | Lochner | 267/136 |
| 4,562,566 | 12/1985 | Eisemann | 369/75.2 |
| 4,633,973 | 1/1987 | Kitano | 181/207 |
| 4,661,868 | 4/1987 | Tezuka | 360/96.6 |
| 4,731,777 | 3/1988 | Yoshitoshi et al. | 369/263 |
| 4,747,000 | 5/1988 | Godsoe | 360/96.6 |
| 4,787,005 | 11/1988 | Tezuka et al. | 360/130.2 |
| 4,812,932 | 3/1989 | Hishinuma et al. | 360/97.01 |
| 4,922,478 | 5/1990 | Verhagen | 369/247 |
| 5,247,496 | 9/1993 | Yamatani | 369/13 |
| 5,329,504 | 7/1994 | Mukawa | 369/13 |
| 5,347,507 | 9/1994 | Kühn | 369/263 |
| 5,355,357 | 10/1994 | Yamamori et al. | 369/75.2 |
| 5,379,990 | 1/1995 | Ando et al. | 267/34 |
| 5,432,660 | 7/1995 | Kono et al. | 360/96.6 |
| 5,450,377 | 9/1995 | Eom | 369/13 |

FOREIGN PATENT DOCUMENTS

| 0288126A1 | 10/1988 | European Pat. Off. |
| 0583946A1 | 2/1994 | European Pat. Off. |
| 1797-242 | 3/1968 | Germany |
| 3914303A1 | 10/1990 | Germany |
| 59-5401 | 1/1984 | Japan |
| 62-146478 | 6/1987 | Japan |
| 640376 | 7/1950 | United Kingdom |

*Primary Examiner*—Stuart S. Levy
*Assistant Examiner*—Brian E. Miller
*Attorney, Agent, or Firm*—Limbach & Limbach L.L.P.

[57] ABSTRACT

The recording and/or reproducing apparatus according to the present invention includes a recording and/or reproducing unit finely movably mounted within a main body of the apparatus via plural damper units. The recording and/or reproducing unit has a holder for the disc cartridge rotatably mounted thereon for holding and loading or unloading the disc cartridge on or from the recording and/or reproducing unit. A rotary member is rotatably mounted on the main body of the apparatus for covering the recording and/or reproducing unit. An engagement member is mounted on the inner surface of the rotary member for engaging with the holder for rotating the holder in a direction of loading and unloading the recording medium by an opening of the rotary member. The engagement member is movably mounted on the rotary member. When the rotary member covers the recording and/or reproducing unit, and the recording and/or reproducing unit is finely moved within the main body of the apparatus, so that the recording and/or reproducing unit is contacted with the engagement member, the engagement member is moved so as to follow up with the fine movement of the rotary member. The apparatus also includes a biasing member for perpetually biasing the engagement member in a direction of being engaged with the holder.

4 Claims, 33 Drawing Sheets

RECORDING AND/OR REPRODUCING APPARATUS FOR RECORDING MEDIUM AND DAMPER MECHANISM EMPLOYED IN SUCH APPARATUS

This is a divisional of application Ser. No. 08/295,266, filed Aug. 24, 1994, now abandoned.

BACKGROUND OF THE INVENTION

1. Field of the Invention

This invention relates to a recording and/or reproducing apparatus employing a disc such as a magneto-optical disc or an optical disc as a recording medium for information signals. More particularly, it relates to such apparatus in which its recording and/or reproducing unit is supported within a main body of the apparatus in a floating state via a plurality of damper units and elastic members.

2. Description of the Related Art

Up to now, a recording and/or reproducing apparatus employing a recording medium such as a magneto-optical disc or an optical disc for information signals has been proposed. The magneto-optical disc or the optical disc, employed as a recording medium for such recording and/or reproducing apparatus, is contained in a main cartridge body to form a disc cartridge and loaded in such state in the recording and/or reproducing apparatus.

The recording and/or reproducing apparatus has an optical pickup and a magnetic head as means for writing and/or reading information signals on or from the magnetic recording medium. The optical pickup and the magnetic head are mounted on a chassis provided in the main body of the apparatus to constitute a recording and/or reproducing unit. On the other hand, the disc cartridge having having the magneto-optical disc or the optical disc therein as a recording medium is loaded at a cartridge loading position in the recording and/or reproducing apparatus so as to be positioned relative to the recording and/or reproducing unit provided in the recording and/or reproducing apparatus. When the disc cartridge is loaded in the cartridge loading position, information signals are recorded on the magneto-optical disc with the aid of the optical pickup and a magnetic head, or the information signals recorded on the magneto-optical disc or the optical disc are reproduced.

It is noted that, if impacts are applied to the main body of the apparatus to produce vibrations in the recording and/or reproducing unit, it becomes impossible to record or reproduce information signals on or from the recording medium. That is, if the recording and/or reproducing unit is subjected to vibrations, the optical pickup is deviated in its position relative to the recording medium, such that it becomes impossible for the light beam radiated by the optical pickup to follow the recording track formed on the recording medium, thus rendering it impossible to record/reproduce information signals. Above all, when writing information signals on the magneto-optical disc, the information signals and table-of-contents data concerning the information signals are written in this order. The table-of-contents information indicates addresses or the like (which are the write positions of the information signals recorded on the magneto-optical disc) and represents the information indispensable in reading out the recorded information. The information signals, for which associated table-of-contents information has not been recorded, cannot be subsequently read out. Consequently, should track skip of the light beam scanning a recording track deviated from the pre-set recording track due to vibrations be produced in the course of recording of the information signals, or when the recording of the information signals has been completed but the recording of the associated table-of-contents information has not been completed, it becomes impossible to read out the recorded information signals.

With certain versions of this type of the recording and/or reproducing apparatus, especially of the portable type, the recording and/or reproducing unit is supported in a floating state in the main body of the apparatus via a plurality of damper units. Such a damper unit is made up of an elastic tubular section formed of a visco-elastic material, such as rubber, as a vibration absorbent member, fitted on a pivot set on a frame of the main body of the apparatus, and a compression coil spring, as an elastic member, fitted on the outer side of the elastic tubular member. On this elastic tubular section of the damper unit is supported a supporting piece formed on a chassis constituting the recording and/or reproducing unit mounting the optical pickup. Thus the recording and/or reproducing unit is supported in a floating manner on the frame constituting the main body of the apparatus by means of the damper units.

With the recording and/or reproducing unit thus supported on the main body of the apparatus by means of the damper units, any impacts or vibrations applied to the main body of the apparatus may be absorbed by the damper units, so that information signals may be recorded and/or reproduced without being affected by the impacts or vibrations.

Meanwhile, the damper unit supporting the recording and/or reproducing unit has not only the function for absorbing impacts or vibrations applied to the main body of the apparatus, but also the function of supporting the recording and/or reproducing unit with respect to the main body of the apparatus. Thus it is necessary for the damper unit to exhibit resiliency high enough to support the recording and/or reproducing unit, such that it is difficult to lower the resonant frequency of the damper unit and thus the vibrations cannot be absorbed sufficiently. In addition, the elastic tubular member constituting the damper unit is put under a large weight of the recording and/or reproducing unit and hence in a state of being perpetually elastically deformed, while it is elastically deformed on application of vibrations under the weight of the recording and/or reproducing unit, so that it is deformed beyond the elastic limit. Thus the elastic tubular section is susceptible to creepage and formation of crevices, such that sufficient durability cannot be maintained. Besides, the recording and/or reproducing unit, supported by the above-described damper unit, cannot be maintained at the correct supporting position relative to the main body of the apparatus due to chronological changes of the elastic tubular section, thus leading to deviation in the relative supporting position of the recording/reproducing unit with respect to the main body of the apparatus. For example, there is produced a deviation between the holder for the disc cartridge provided on the main body of the apparatus and the cartridge loading position on the reproducing unit, thus occasionally rendering it impossible to load the disc cartridge in position.

On the other hand, the damper units, supporting the recording and/or reproducing unit in a floating manner relative to the main body of the apparatus, are elastically deformed on application of impacts or vibrations to the main body of the apparatus, for absorbing the impacts or vibrations. If the damper units are elastically deformed, the recording and/or reproducing unit, supported by these damper units, is shifted or deviated relative to a frame constituting the main body of the apparatus. If the damper units, thus elastically deformed under impacts or vibrations applied to the main body of the apparatus, are collided against the frame of the recording and/or reproducing unit, the impacts or vibrations applied to the main body of the apparatus are directly transmitted to the recording and/or reproducing unit. Thus it becomes impossible for the light beam to follow the recording track formed on the recording medium and hence to record and/or reproduce information signals with optimum recording/reproducing characteristics.

In the recording and/or reproducing apparatus in which the recording and/or reproducing unit is supported in a floating manner with respect to the main body of the apparatus, there is provided a gap between the recording and/or reproducing unit and the frame which is large enough to permit the damper units to be moved without being collided against the recording and/or reproducing unit when the damper units undergo elastic deformation. By provision of such gap between the main body of the apparatus and the recording and/or reproducing unit, it becomes difficult to achieve size reduction of the recording and/or reproducing apparatus.

OBJECTS AND SUMMARY OF THE INVENTION

It is an object of the present invention to provide a novel recording and/or reproducing apparatus wherein impacts or vibrations applied to the main body of the apparatus may be positively absorbed and prevented from being transmitted to the recording and/or reproducing unit provided within the main body of the apparatus.

It is another object of the present invention to provide a novel recording and/or reproducing apparatus wherein vibrations applied to the main body of the apparatus may be reliably interrupted and the recording and/or reproducing unit provided within the main body of the apparatus may be perpetually supported at a pre-set position so that information signals may be recorded and/or reproduced with optimum recording/reproducing characteristics on a recording disc as a signal recording medium, such as the magneto-optical disc.

It is a further object of the present invention to provide a novel recording and/or reproducing apparatus wherein the recording and/or reproducing unit may be supported at a pre-set position by the damper units with respect to the main body of the apparatus.

It is a further object of the present invention to provide a damper unit which can be easily assembled and easily mounted on the recording and/or reproducing apparatus.

The recording and/or reproducing apparatus according to the present invention includes a recording and/or reproducing unit mounted on a base member via plural damper units and a closure member rotatably mounted on the base member for covering the recording and/or reproducing unit for covering the recording and/or reproducing unit. A plate spring biasing the recording and/or reproducing unit towards the base member is provided between the closure member and the recording and/or reproducing unit. When the closure member is at a position of covering the recording and/or reproducing unit, the recording and/or reproducing unit is maintained at a position counterbalancing the weight of the recording and/or reproducing unit, the elastic force of the damper units and the elastic force of the plate spring.

Each damper unit supporting the recording and/or reproducing unit on the base member comprises a vibration absorbing member and a further elastic member fitted on the outer side of the vibration absorbing member.

The recording and/or reproducing apparatus according to the present invention further includes a supporting member on which the recording and/or reproducing unit is arranged. A further elastic member constituting the damper unit is provided between the base member and the supporting member for biasing the recording and/or reproducing unit towards the closure member against the force of the plate spring.

Each damper unit has a mounting member passed through a vibration absorbing member. The mounting member has its one end mounted on the supporting member and includes a pair of rests carrying both ends of the vibration absorbing member. The vibration absorbing member of the damper unit has an engagement recess engaged with the base member carrying the recording and/or reproducing unit, a substantially cylindrical first portion provided on one side of the engagement recess and fitted with the further elastic member and a substantially conical second portion provided on the opposite side of the engagement recess. The second portion is larger in diameter than the first portion. The vibration absorbing member is unitarily formed by the engagement recess and the first and second portions.

The recording and/or reproducing apparatus according to the present invention includes a recording and/or reproducing unit finely movably mounted within a main body of the apparatus via plural damper units. The recording and/or reproducing unit has a holder for the disc cartridge rotatably mounted thereon for holding and loading or unloading the disc cartridge on or from the recording and/or reproducing unit. A rotary member is rotatably mounted on the main body of the apparatus for covering the recording and/or reproducing unit. An engagement member is mounted on the inner surface of the rotary member for engaging with the holder for rotating the holder in a direction of loading or unloading the recording medium by an opening movement of the rotary member. The engagement member is movably mounted on the rotary member. When the rotary member covers the recording and/or reproducing unit, and the recording and/or reproducing unit is moved finely within the main body of the apparatus, so that the recording and/or reproducing unit is contacted with the engagement member, the engagement member is moved so as to follow up with the fine movement of the rotary member. The apparatus also includes a biasing member for perpetually biasing the engagement member in a direction of being engaged with the holder.

Other objects, advantages and construction of the present invention will become more apparent from the following description of the embodiments and the claims.

DESCRIPTION OF THE PREFERRED EMBODIMENTS

Figure 1:
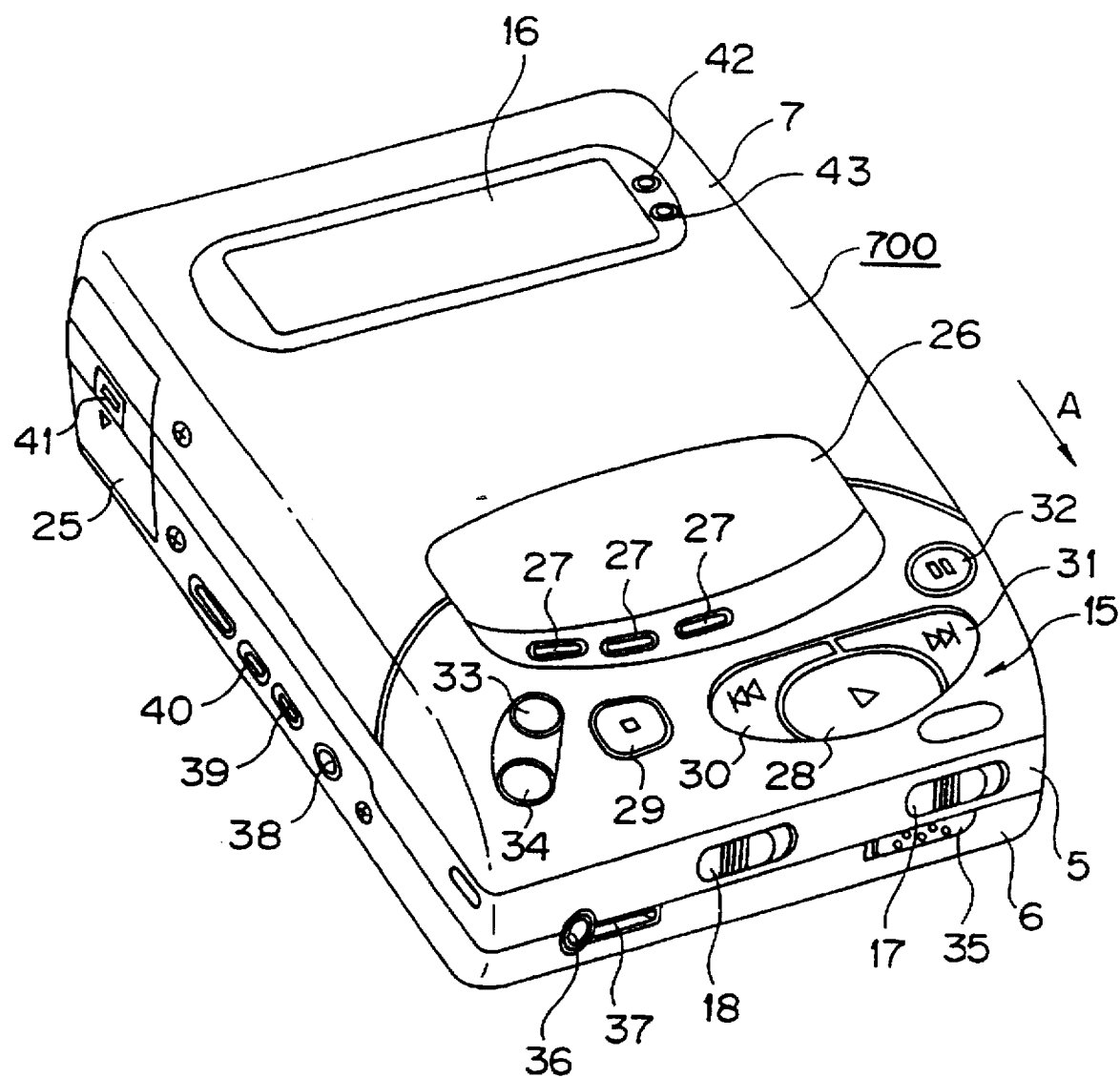
FIG. 1 is a perspective view showing a recording and/or reproducing apparatus according to the present invention.
Figure 2:
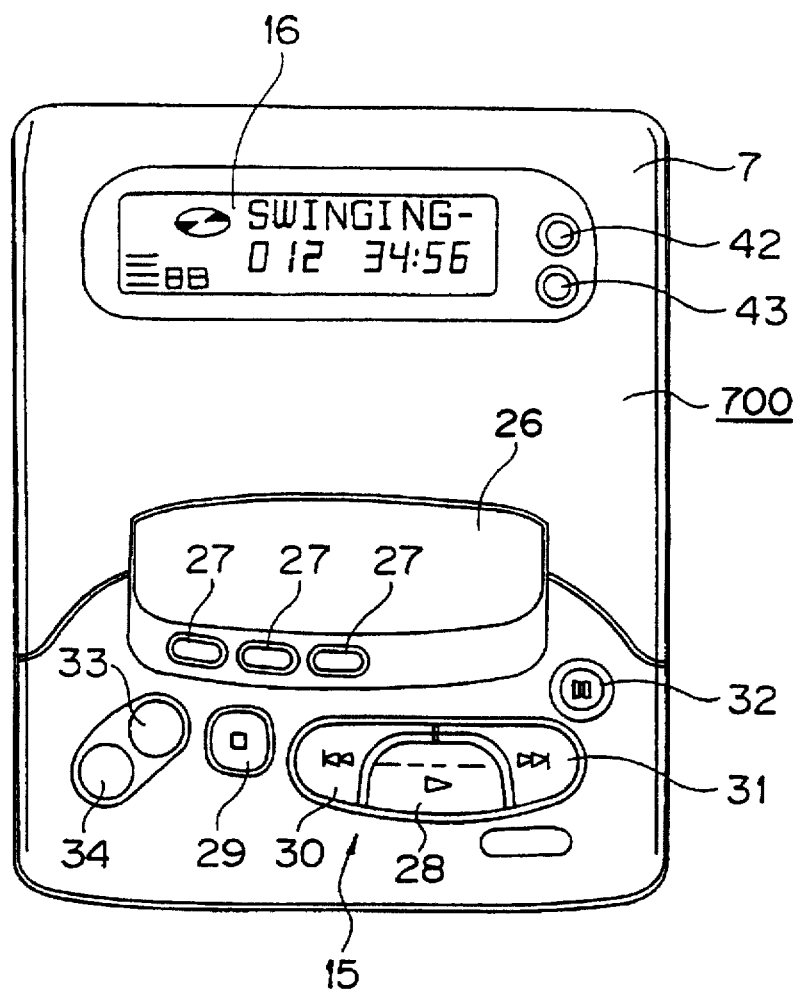
FIG. 2 is a plan view of the recording and/or reproducing apparatus shown in FIG. 1.

Referring to the drawings, preferred embodiments of the present invention will be explained in detail. These embodiments are directed to the disc recording and/or reproducing apparatus employing, as the recording medium, the magneto-optical disc enabling re-recording of information signals or an optical disc employed only for reproducing information signals.

Summary of the Overall Constitution of the disc Recording/Reproducing Apparatus

Figure 8:
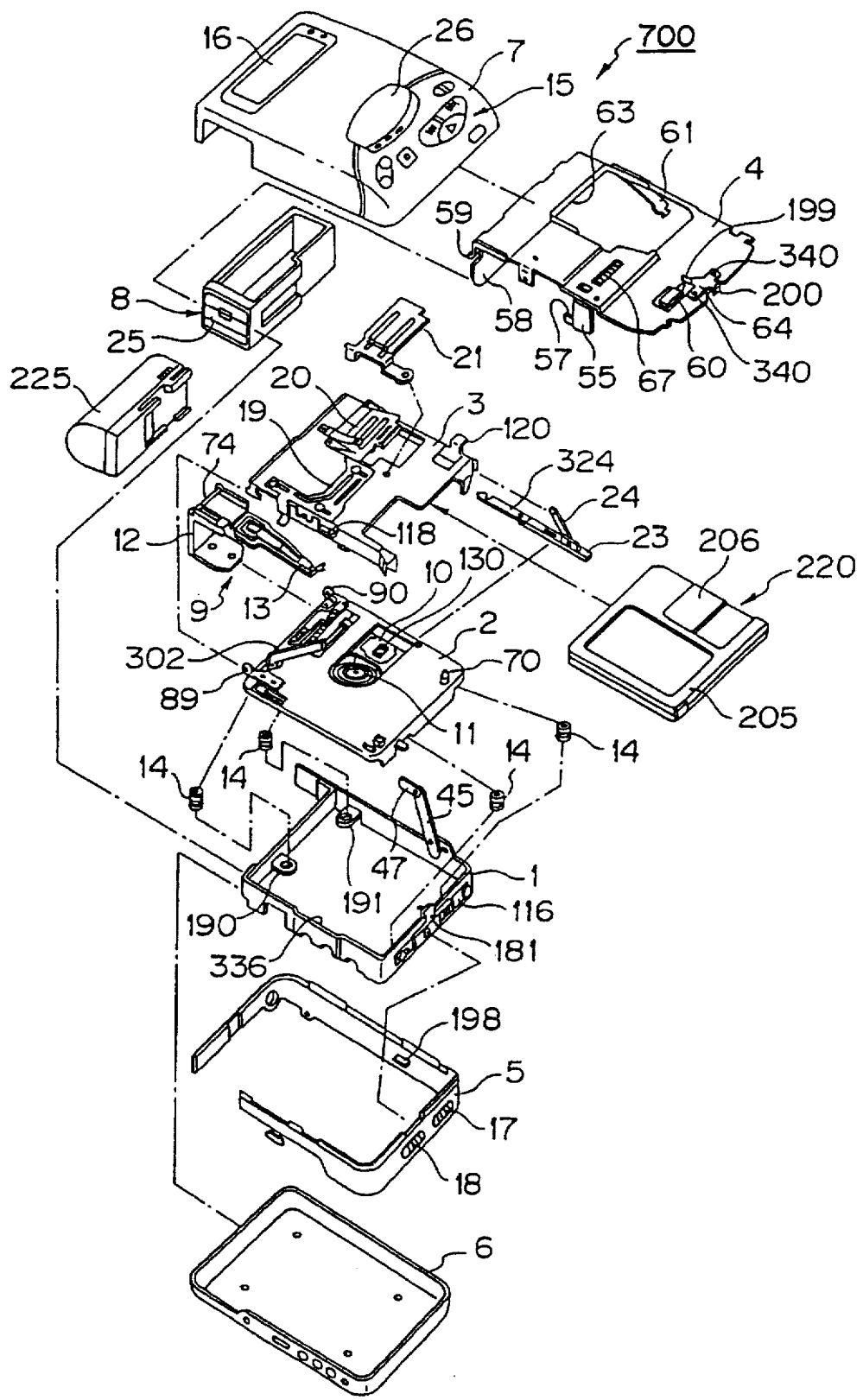
FIG. 8 is an exploded perspective view of the recording and/or reproducing apparatus shown in FIG. 1.
Figure 9:
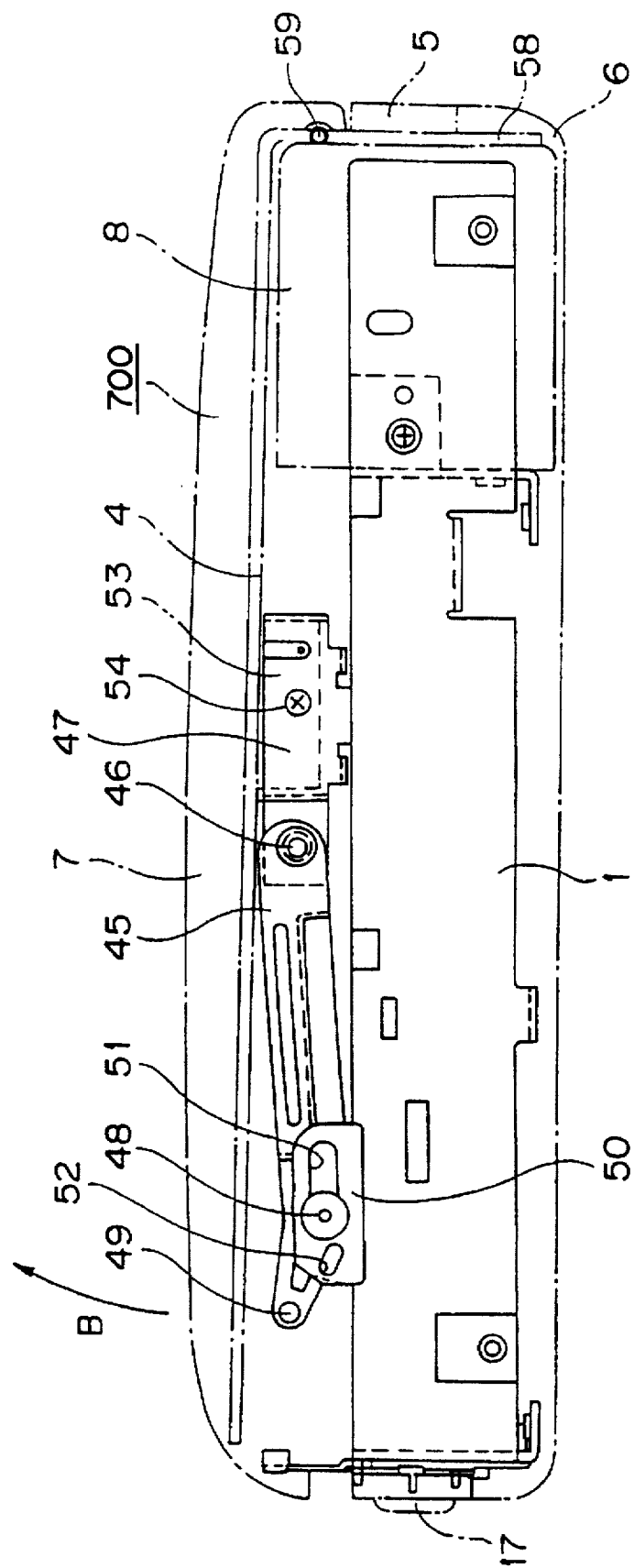
FIG. 9 is a right-hand side view showing a casing constituting of the main body of the recording and/or reproducing apparatus according to the present invention.
Figure 12:
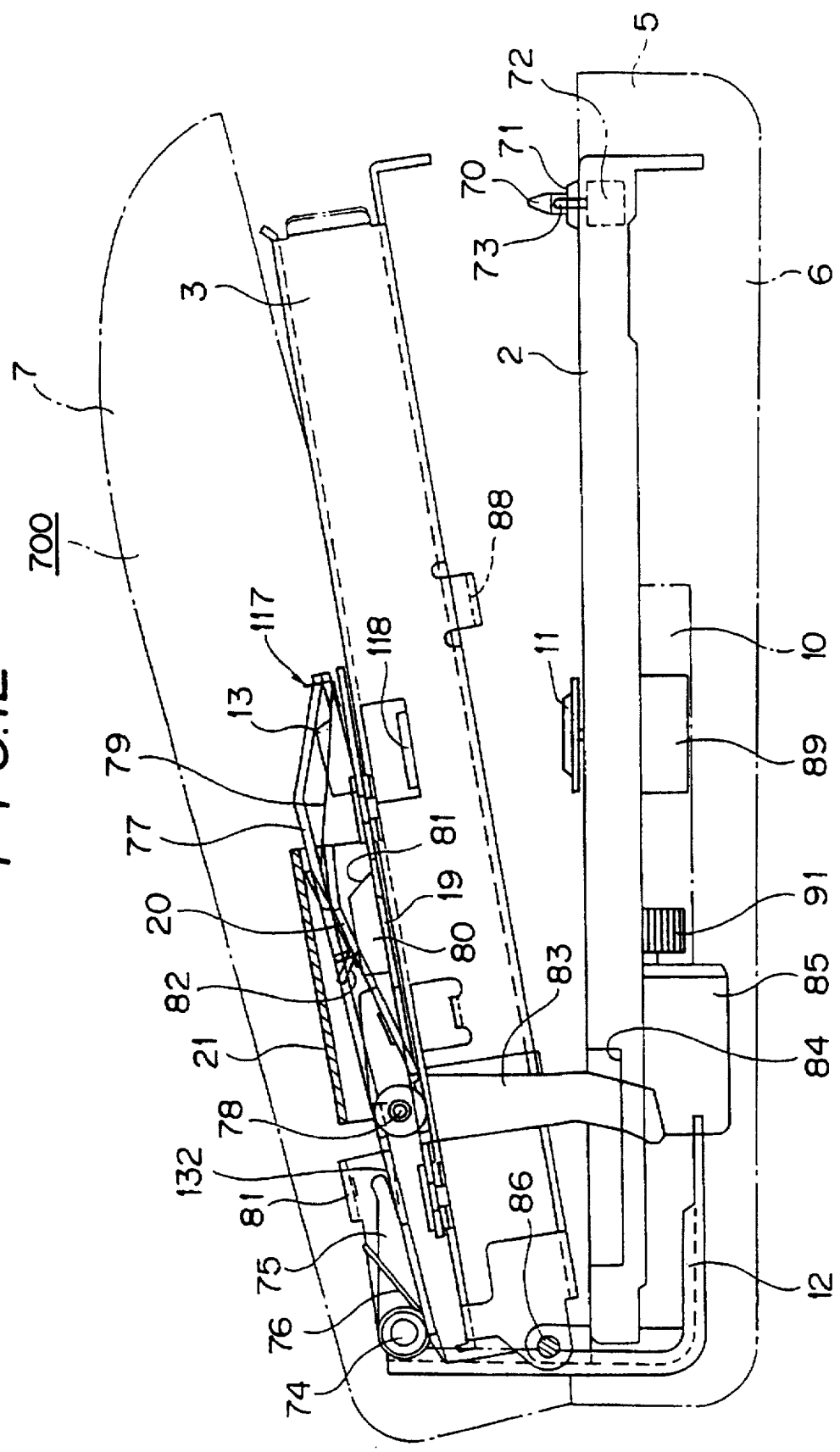
FIG. 12 is a left-hand side view showing an inner construction of the recording and/or reproducing apparatus in the ejecting state.

The disc recording and/or reproducing apparatus according to the present invention includes a frame 1 constituting a main body of the apparatus and a base member 2 supported by the frame 1 in the floating state by plural damper units 14, as shown in FIG. 8. A battery casing 8, an outer cover 7 and a lower cover 6 are mounted on the frame 1. A lid 700 having an upper cover 7 and a cover support plate 4 is rotatably mounted on the battery casing 8. With the present disc recording and/or reproducing apparatus, the lid 700 is rotatably mounted on a main body of the apparatus made up of the frame 1, battery casing 8, outer cover 5 and the lower cover 6. The lid 700 opens or closes the upper side of the main body of the apparatus, as shown in FIGS. 9 and 12. A cartridge holder 3 is rotatably mounted on the upper surface of the base member 2.

Between the upper cover 7 and the cover support plate 4, making up the lid 700, there is enclosed an electronic circuit board, not shown, electrically connected to a key input unit 15 and a display section 16 provided on the upper surface of the upper cover 7. The key input unit 15 has a play button 28, a forward track jump button 31, a reverse tack jump button 30, a pause button 32, a stop button 29 and output sound volume adjustment buttons 33, 34, as shown in FIG. 1. The display section 16 is constituted by a planar display device, such as a liquid crystal display device. On the display section 16 is displayed a variety of information data depending on the operating modes of the disc recording and/or reproducing apparatus. Another pushbutton switch 27, constituting the key input unit 15, is covered by a slide cover 26, mounted on the upper cover 7 slid towards the front side of the main body of the apparatus as indicated by arrow A in FIG. 1.

Figure 36:
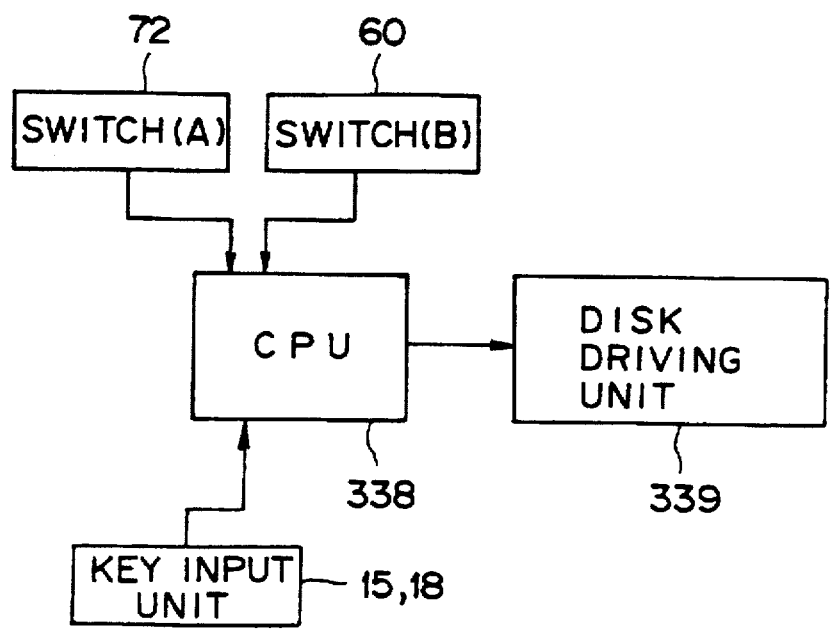
FIG. 36 is a block circuit diagram showing a controlling section of the recording and/or reproducing apparatus according to the present invention.

Within the main body of the apparatus, there is accommodated another electronic circuit board, not shown, on which a CPU 338 as a control circuit is mounted, as shown in FIG. 36. The key input unit 15 is electrically connected to the CPU 338. The CPU 338 is responsive to the input signals to effect driving control of a disc driving mechanism of the recording and/or reproducing unit provided on the base member 2.

Constitution of Disc Cartridge

A magneto-optical disc 200, employed as a recording medium for information signals for the recording and/or reproducing apparatus according to the present invention, is now explained. The magneto-optical disc 200 is comprised of a disc substrate formed of light-transmitting transparent synthetic resin material, such as polycarbonate, having a diameter of approximately 64 mm, and a signal recording layer of a magnetic material deposited thereon. The signal recording layer is locally heated to a temperature higher than the Curie temperature by a light beam radiated from a light source, such as a semiconductor laser, and converged on the recording layer. The information signals thus recorded may be read out by radiating a linear polarized light beam, such as a laser beam, on the signal recording layer, and detecting the return light from the magneto-optical disc 200.

An optical disc 201, used for reproducing information signals, is comprised of a disc substrate, similar to that of the magneto-optical disc enabling re-recording of information signals, and a reflective layer of a metal material, such as aluminum, deposited thereon. A string of small-sized pits, corresponding to the information signals, are formed on the disc substrate of the optical disc by injection molding or the like means. The information signals recorded on the optical disc 200 may be read out by radiating a light beam on the pit string and detecting the return light from the optical disc by a photodetector, not shown.

Figure 38:
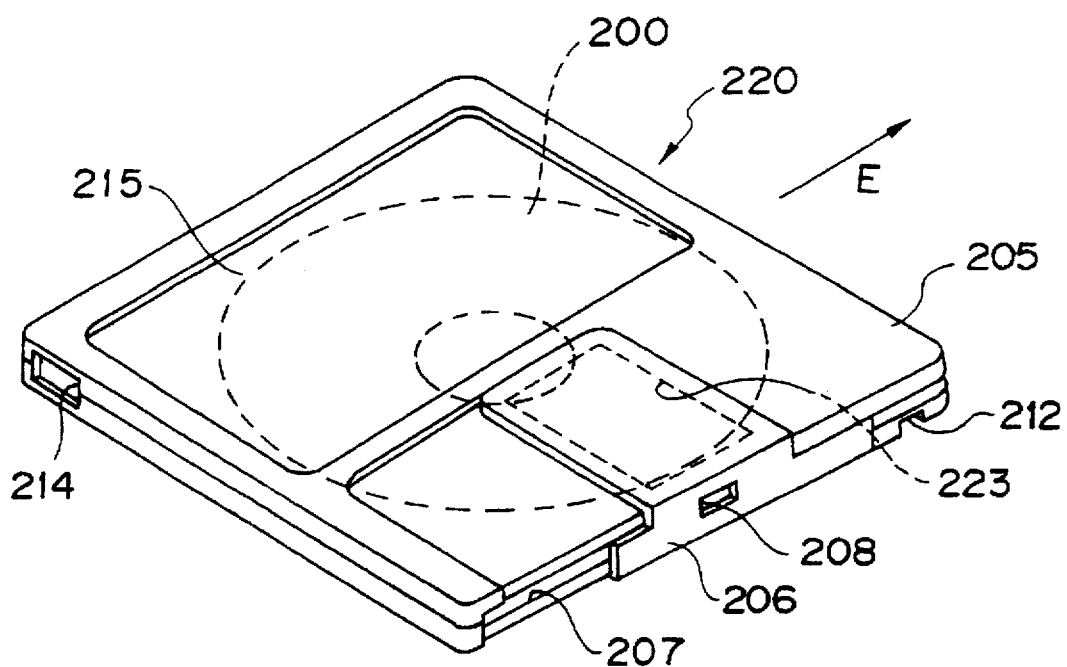
FIG. 38 is a perspective view, as seen from an upper side, showing a disc cartridge enabling re-recording of information signals employed in the recording and/or reproducing apparatus according to the present invention.
Figure 39:
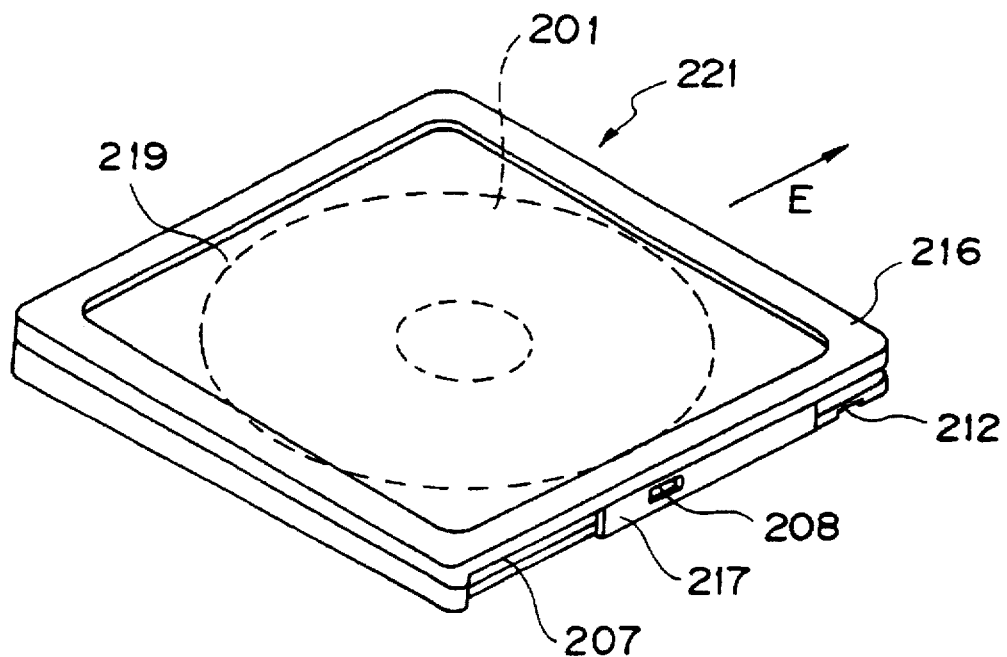
FIG. 39 is a perspective view, as seen from an upper side, showing a replay-only disc cartridge employed in the recording and/or reproducing apparatus according to the present invention.
Figure 40:
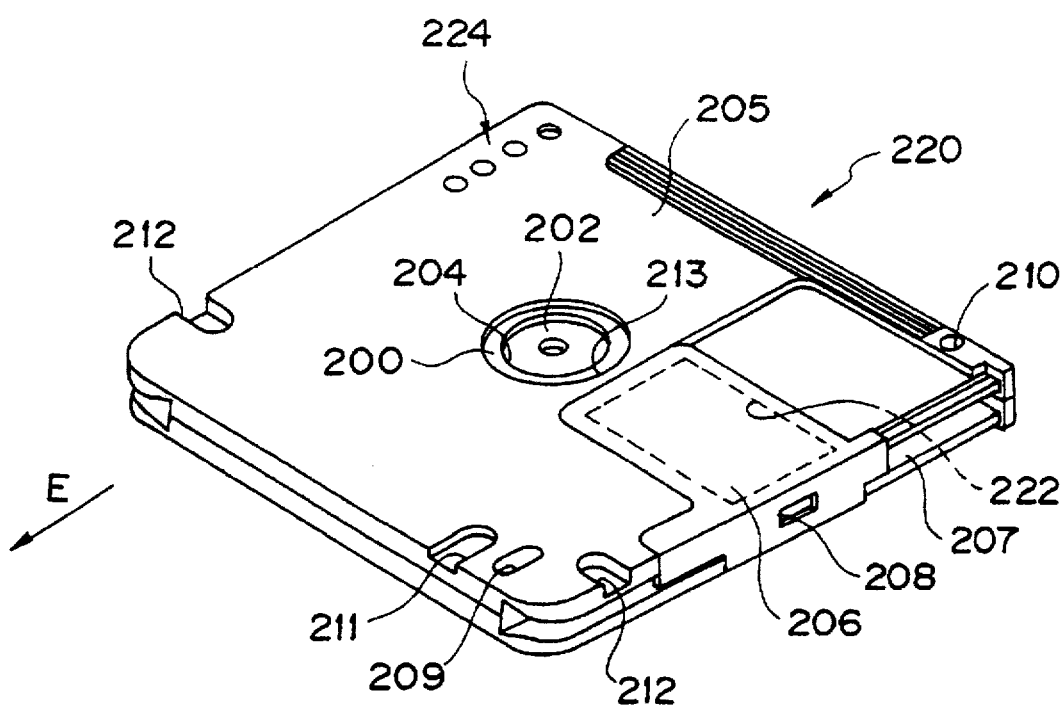
FIG. 40 is a perspective view, as seen from below, the disc cartridge shown in FIG. 38.

The magneto-optical disc 200 and the optical disc 201 are rotatably accommodated in main cartridge bodies 205, 216, respectively, for constituting disc cartridges, as shown in FIGS. 38 to 41. The cartridge main body 205 of the disc cartridge 220, housing the magneto-optical disc 200 for enabling both recording and playback of information signals, is formed substantially as a square having each side equal in length to the diameter of the magneto-optical disc 200. The cartridge main body 205 has an aperture 223 for the magnetic head on its upper major surface for partially exposing the signal recording surface of the magneto-optical disc 200 to the outside across its inner and outer rims, as shown in FIG. 38. The cartridge main body 205 has an aperture 222 for the optical pickup in a portion of its lower major surface facing the aperture 223, as shown in FIG. 40. At a mid portion on the lower major surface is formed a chuck aperture 213.

The aperture 223 for the magnetic head and the aperture 222 for the optical pickup, formed in the main cartridge body 205, are opened or closed by a shutter member 206 movably mounted on the main cartridge body 205. The shutter member 206, molded from a synthetic resin or bent from a metallic sheet, has a pair of shutter plate portions large enough to close the apertures 222, 223 and a connecting web portion interconnecting these shutter plate portions, and is substantially U-shaped in cross-section. The shutter member 206 is carried for movement along a lateral side of the main cartridge body 205 by having its connecting web portion engaged in a support groove 207 formed in the main cartridge body 205. That is, the shutter member 206 opens or closes the apertures 223, 222 by being moved along a lateral side of the main cartridge body 205.

Figure 41:
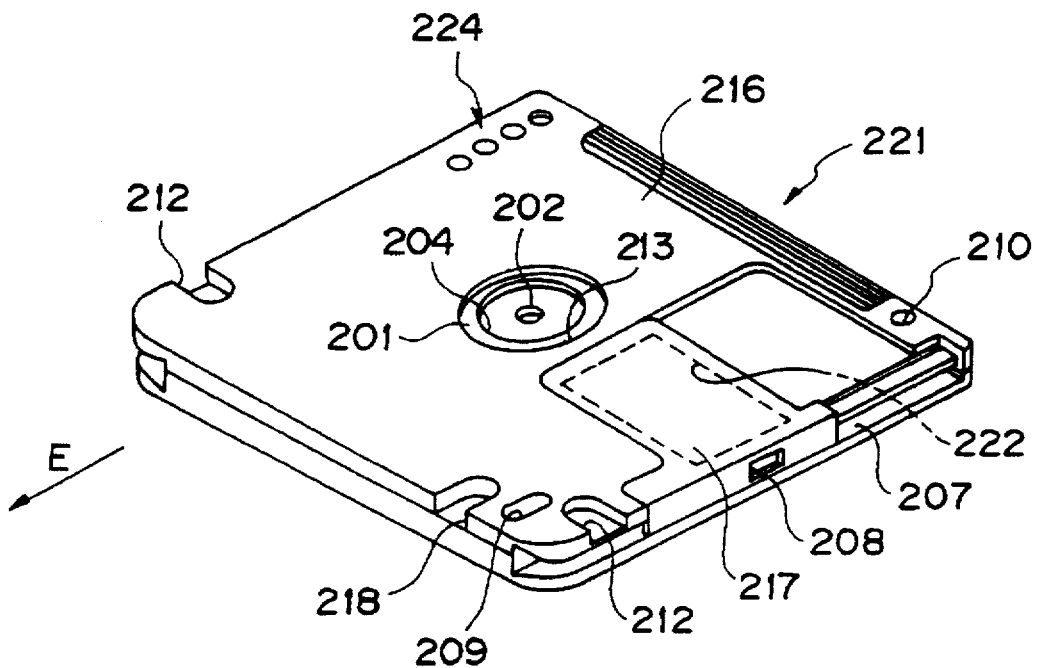
FIG. 41 is a perspective view, as seen from below, the disc cartridge shown in FIG. 39.

The main cartridge body 216 for the disc cartridge 220, housing the replay-only optical disc 201, is formed as a square having the length of each side substantially equal to the diameter of the optical disc 201 housed therein. In distinction from the above-described recording/reproducing disc cartridge 220, the main cartridge body 216 has a substantially planar upper surface, that is an upper surface devoid of an aperture, as shown in FIG. 39. It is in the lower surface of the main cartridge body 216 that the aperture 222 for the optical pickup 222 and the chuck aperture 213 are formed, as shown in FIG. 41. The aperture 222 for the optical pickup formed in the cartridge main body 216 is opened or closed by a shutter member 217 movably mounted on the main cartridge body 216. The shutter member 217, molded from a synthetic resin or bent from a metallic sheet, has a pair of shutter plate portions large enough to close the aperture 222 for the optical pickup and a supporting portion interconnecting these shutter plate portions, and is substantially U-shaped in cross-section. The Shutter member 206 is carried for movement along a lateral side of the main cartridge body 205 by having its supporting portion engaged in a support groove 207 formed in the main cartridge body 216. That is, the shutter member 217 opens or closes the aperture for the optical pickup 222 by being moved along a lateral side of the main cartridge body 205.

Each of the shutter members 206, 217, provided respectively in the recording/reproducing disc cartridge 221 and the replay-only disc cartridge 220, is formed at a mid portion of the connecting web portion or the support portion with a shutter-closing opening 208 adapted for being engaged by a shutter-closing operating member provided on the disc recording/reproducing apparatus.

At a mid portion of each of the recording/reproducing disc cartridge 221 and the replay-only disc cartridge 220 is formed a circular chuck opening 204 for the magneto-optical disc 200 and the optical disc 201, respectively. Each of the magneto-optical disc 200 and the optical disc 201 has a chuck plate 202 mounted thereon for closing the chuck aperture 204. The chuck plate 202 is formed of a magnetic metal material, such as iron or stainless steel, as a disc large enough to close the chuck aperture 204. The chuck aperture 204 and the chuck plate 202 are exposed to the outside of the cartridge main bodies 205, 216 via the chuck aperture 213.

In the lower surfaces of the cartridge main bodies 205, 216, there are bored paired forward and rear side positioning openings 209, 210, as shown in FIGS. 40 and 41. The positioning opening 209 is formed near the corner towards the aperture 222 for the optical pickup and is formed as an oblong hole having its longer axis extending in the fore and aft direction. The other positioning opening 210 is located near the other corner towards the aperture 222 for the optical pickup and is formed as a circular hole.

Plural discriminating openings 224 are formed on the lateral sides of the lower surfaces of the cartridge main bodies 205, 216 opposite the shutter members 206, 217. These discriminating openings 224 are used for discriminating the type or the state of the disc accommodated in the cartridge main bodies 205, 216, that is whether or not the information signals can be recorded thereon. A mistaken recording inhibiting member 214 is provided in the cartridge main body 205 of the recording/reproducing disc cartridge 220 so as to be partially exposed to the above-mentioned opposite lateral side, as shown in FIG. 38. The mistaken recording inhibiting member 214 is movable for opening and closing the discriminating openings 224 for changing over the recordable/unrecordable discriminating state. The lower lateral sides of each of the cartridge main bodies 205, 216 are formed with engagement recess 212 engaged by a portion of a loading mechanism during loading of the disc cartridges 220, 221, as shown in FIGS. 40 and 41.

In the lateral surface perpendicular to the lateral surface of the cartridge main body 205 of the recording/reproducing disc cartridge 220 mounting the shutter member 206, there is formed a magneto-optical disc discriminating recess 211, as shown in FIG. 40. In the lateral surface perpendicular to the lateral surface of the cartridge main body 216 of the replay-only disc cartridge 221 mounting the shutter member 217, there is formed a optical disc discriminating recess 218, as shown in FIG. 41. The magneto-optical disc discriminating recess 211 and the optical disc discriminating recess 218 are of different depths and hence the magneto-optical disc 200 may be discriminated from the optical disc 200 based upon such difference in depth.

The above described disc cartridges 220, 221 are inserted into and taken out from the disc recording/reproducing apparatus with the direction parallel to the direction of movement of the shutter members 206, 217, as indicated by arrow E in FIGS. 38 and 39, as the introducing direction.

Constitution of a Casing constituting the Main Body of the Apparatus

Figure 21:
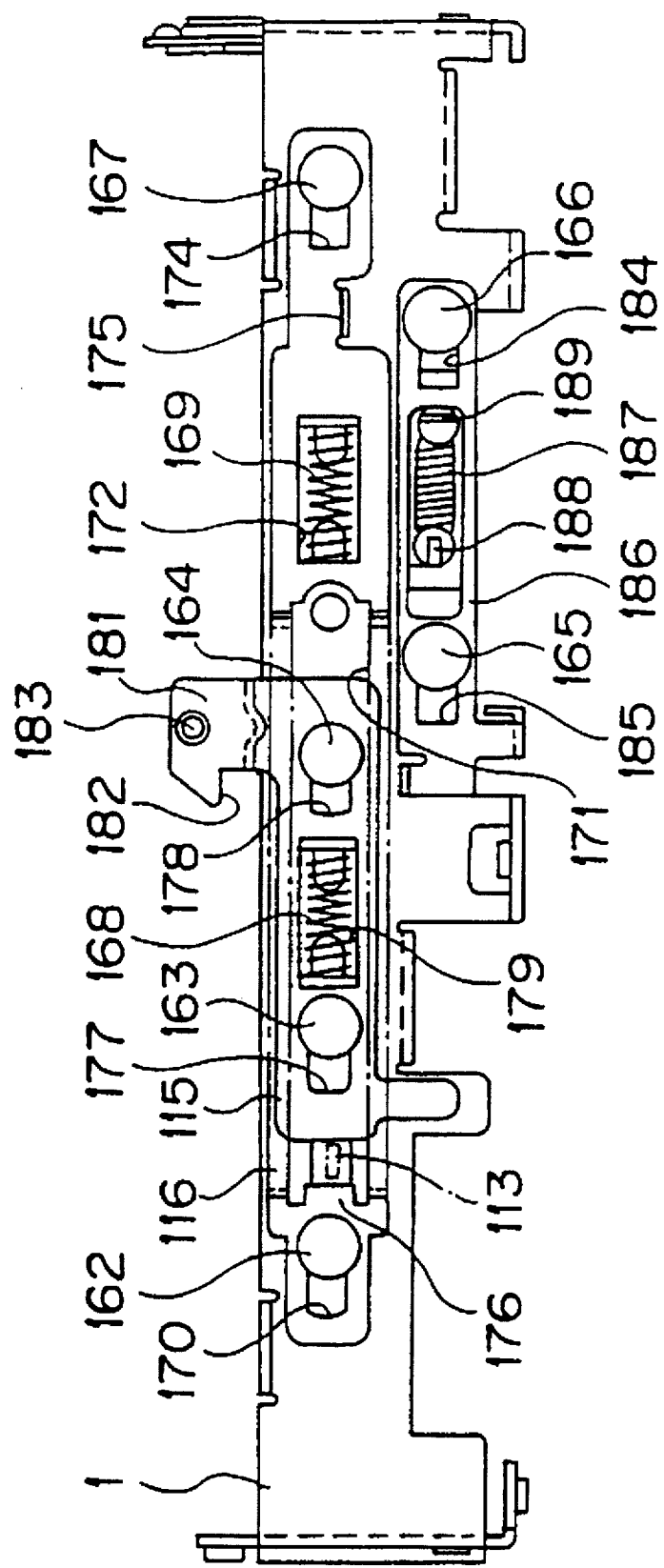
FIG. 21 is a front view showing a construction for retaining an upper lid of the recording and/or reproducing apparatus.
Figure 22:
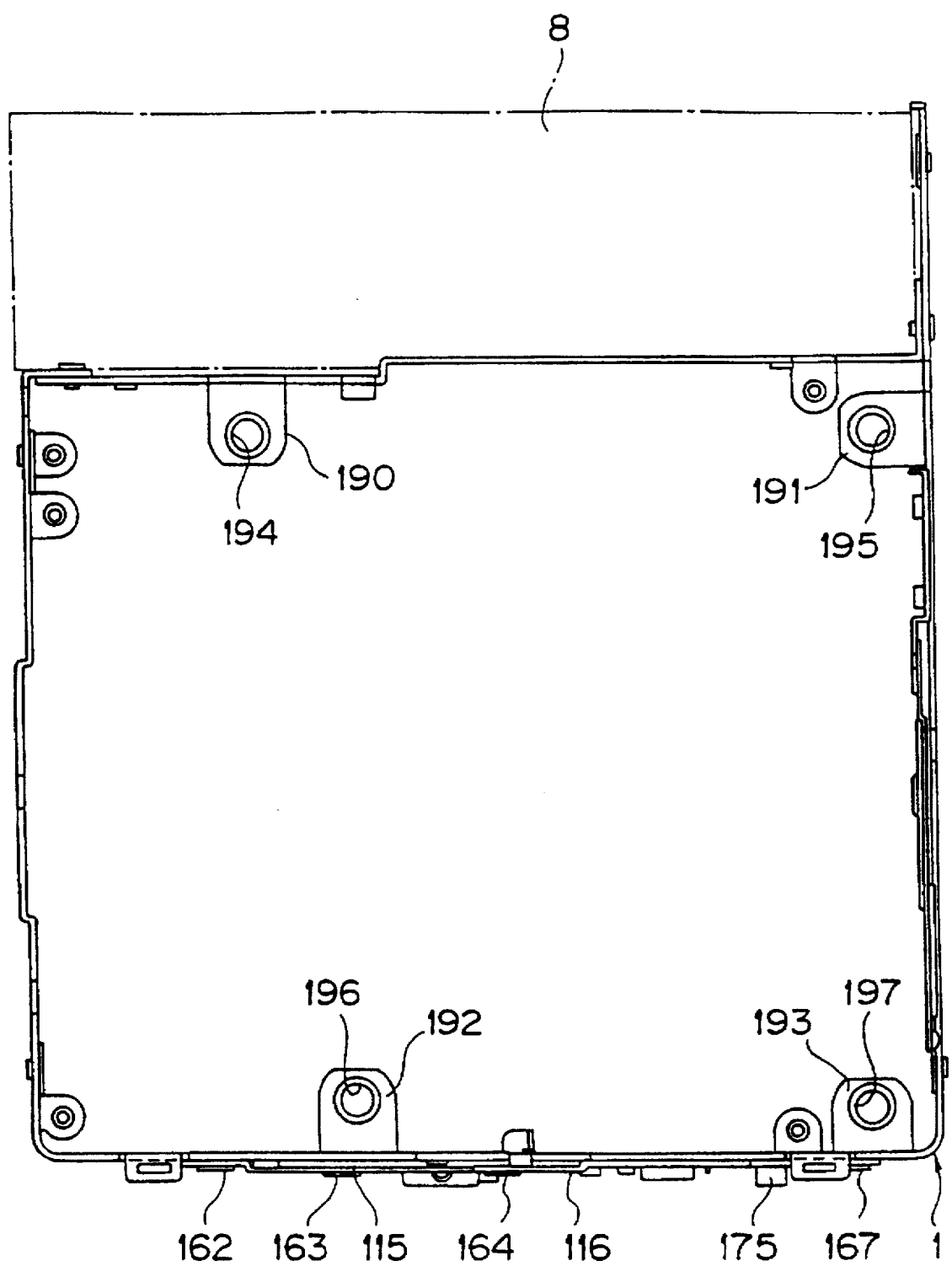
FIG. 22 is a plan view showing a main frame of the recording and/or reproducing apparatus.

The frame 1 of the recording and/or reproducing apparatus is formed as a framework delimiting the peripheral wall of a casing constituting the main body of the apparatus, as shown in FIGS. 21 and 22. On the front surface of the frame 1, there are movably mounted an ejection lever 116, a lock lever 115 and a recording lever 186, as later explained, as shown in FIGS. 21 and 22. The battery casing 8 is formed of a synthetic material to a size capable of holding a battery 225 therein, and is screwed to the rear side of the frame 1. The battery casing 8 is formed in its lateral surface with an opening/closing lid 25 for opening or closing a battery inserting/removing opening, as shown in FIG. 8. The battery 225 is introduced into or removed from the battery inserting/removing opening. The battery 25 may be a rechargeable secondary battery, such as a lithium ion battery, a lithium hydrogen battery or a nickel-cadmium (Ni-Cd) battery, enclosed in a container casing. Positive and negative terminals are provided on the outer surface of the container casing. In the interior of the battery casing 8, there is mounted a power source terminal contacted by each electrode terminal of the battery 225.

Figure 23:
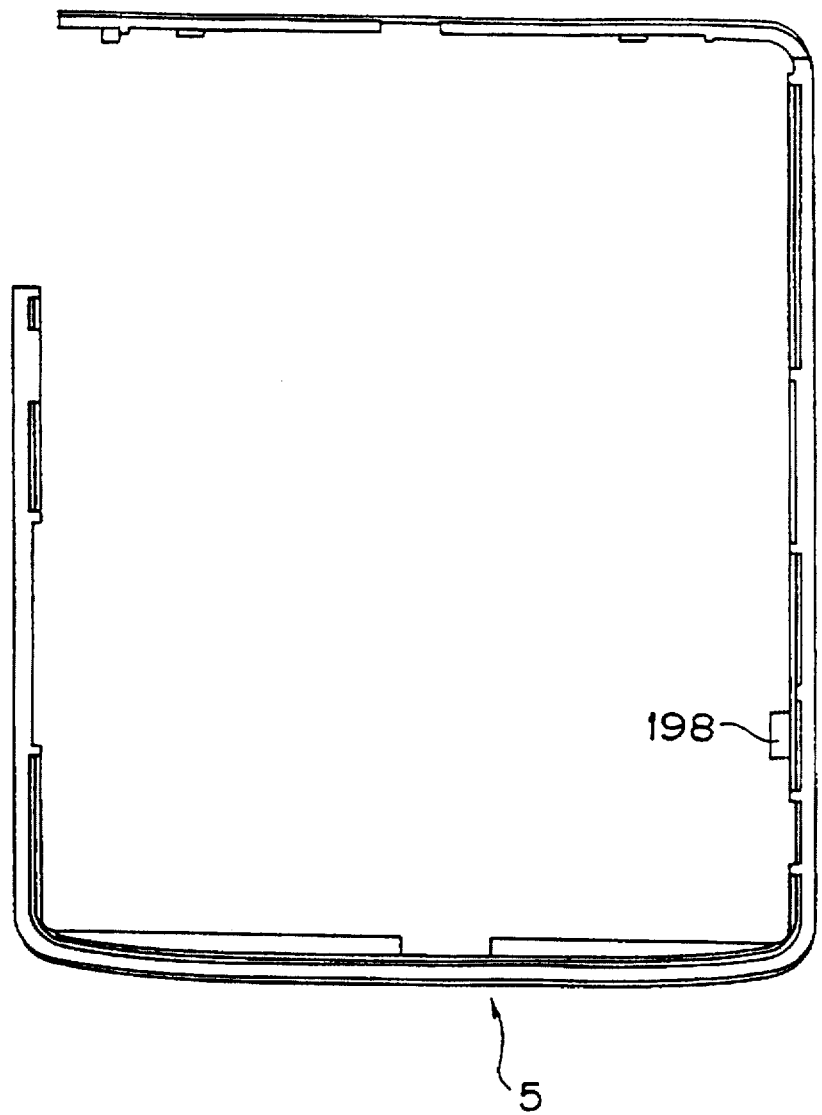
FIG. 23 is a plan view showing an outer cover of the recording and/or reproducing apparatus.
Figure 24:
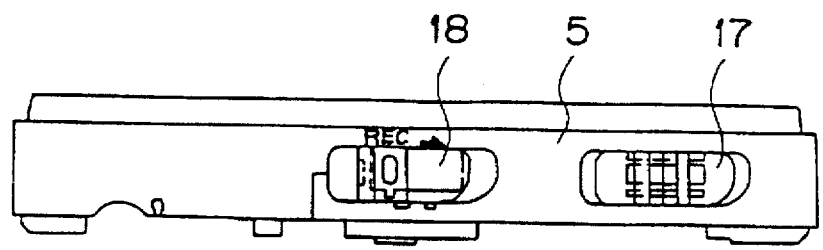
FIG. 24 is a front view showing the outer cover of the recording and/or reproducing apparatus.
Figure 34:
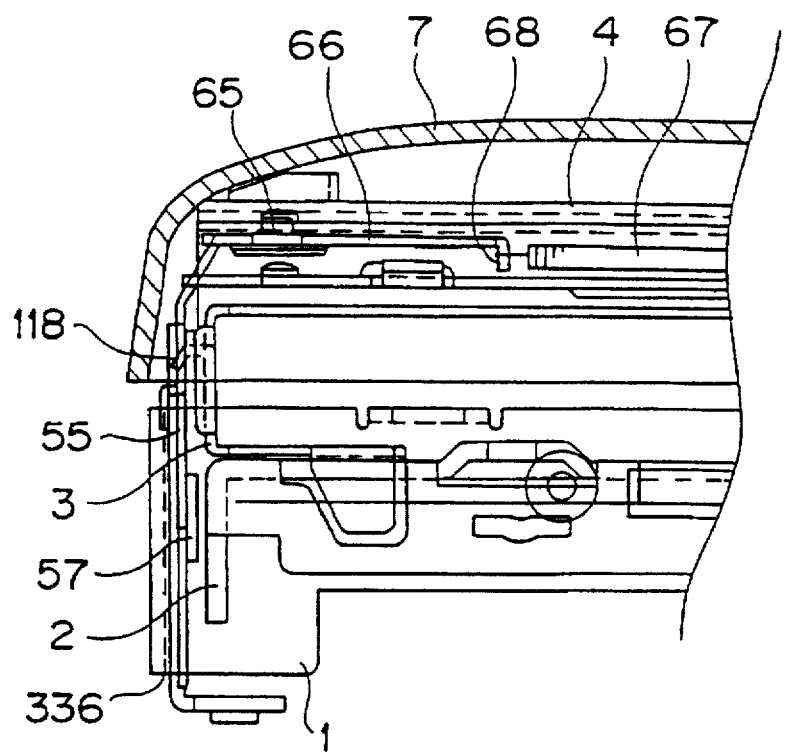
FIG. 34 is a schematic enlarged plan view showing the member for suspending a cartridge holder.
Figure 35:
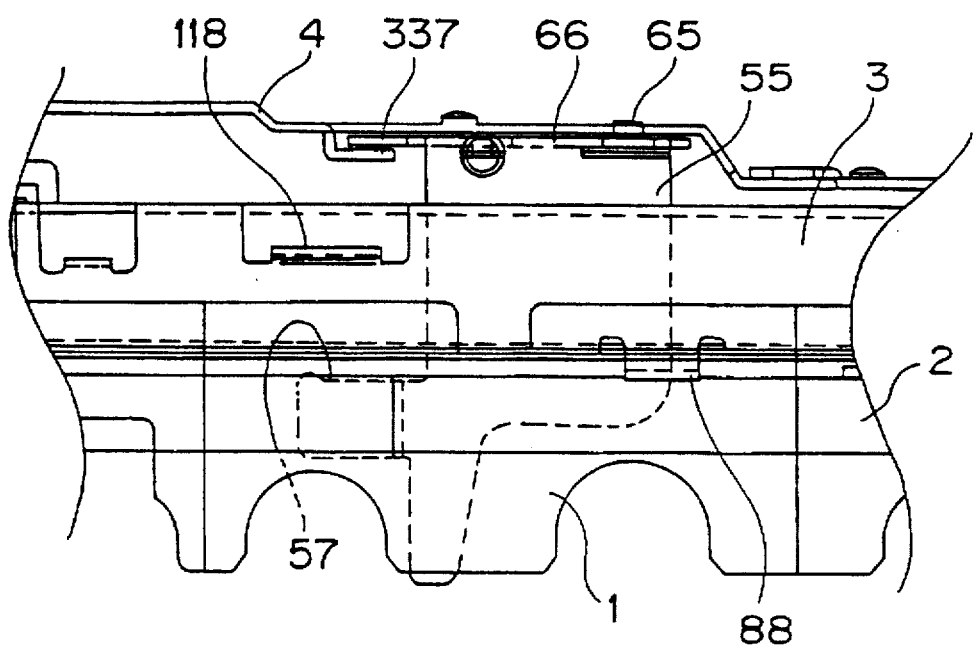
FIG. 35 is a schematic enlarged side view showing the member for suspending a cartridge holder.

The outer cover 5, constituting the casing along with the frame 1, is formed of, for example, synthetic material, and is substantially frame-shaped, as shown in FIGS. 23 and 34. The outer cover 5 is mounted on the frame 1 for sheathing the outer peripheral part of the frame 1 on the front surface of the outer cover 5, there are movably mounted an ejection knob 17 engaged with an engagement lug 175 provided on one end of the ejection lever 116 and a recording knob 18 engaged by an abutment lug 341 provided on the opposite side of the recording lever 186. The ejection knob 17 when slid causes a sliding of the ejection lever 116. The recording knob 18 when slid causes a sliding of the recording lever 186. The recording knob 18 forms a part of the key input section 15 and thrusts a recording start switch, not shown, connected to the CPU 338, via the recording lever 186.

The lower cover 6, constituting the casing along with the frame 1, is formed of metal as a substantially planar plate, as shown in FIGS. 3 to 7. The lower cover is screwed to the lower lateral side of the frame 1 and constitutes the lower surface of the outer casing of the main body of the apparatus.

Figure 3:
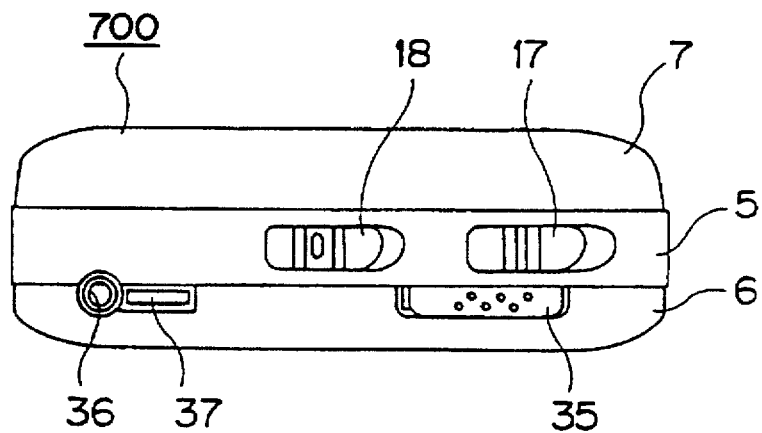
FIG. 3 is a front view of the recording and/or reproducing apparatus shown in FIG. 1.
Figure 4:
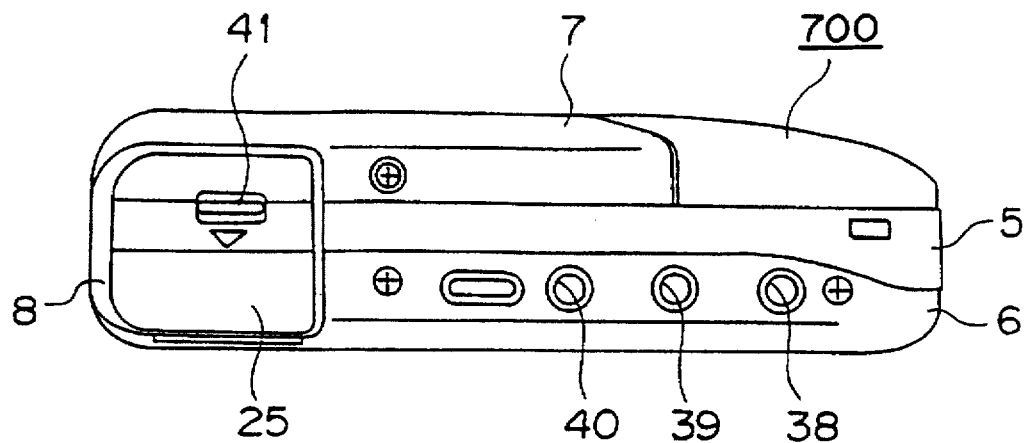
FIG. 4 is a left-hand side view of the recording and/or reproducing apparatus shown in FIG. 1.
Figure 5:
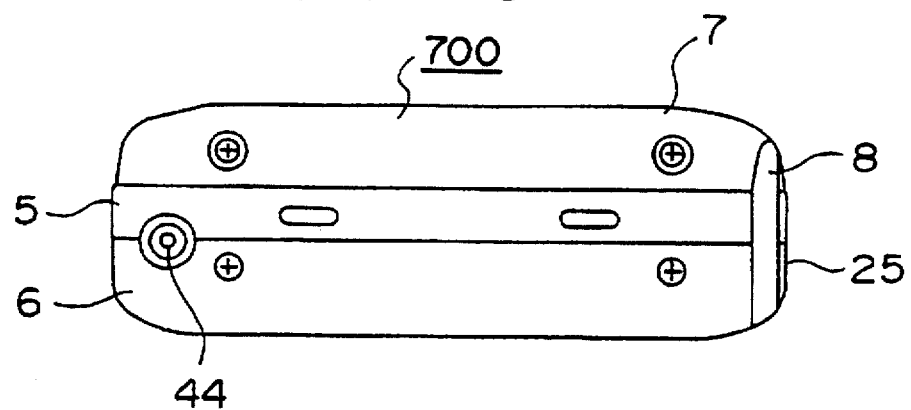
FIG. 5 is a back view of the recording and/or reproducing apparatus shown in FIG. 1.
Figure 6:
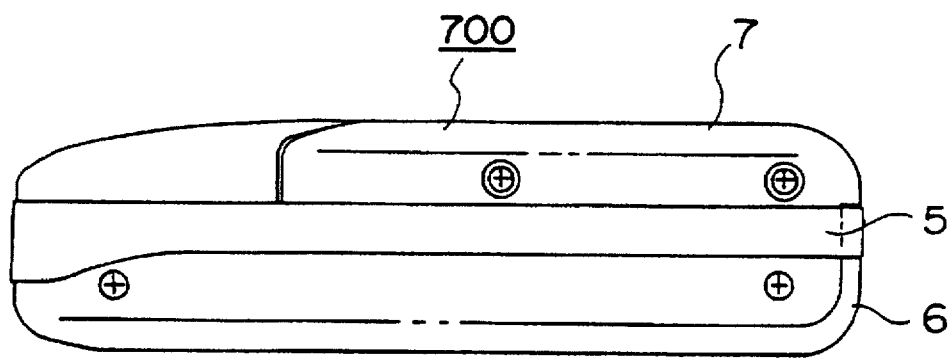
FIG. 6 is a right-hand side view of the recording and/or reproducing apparatus shown in FIG. 1.
Figure 7:
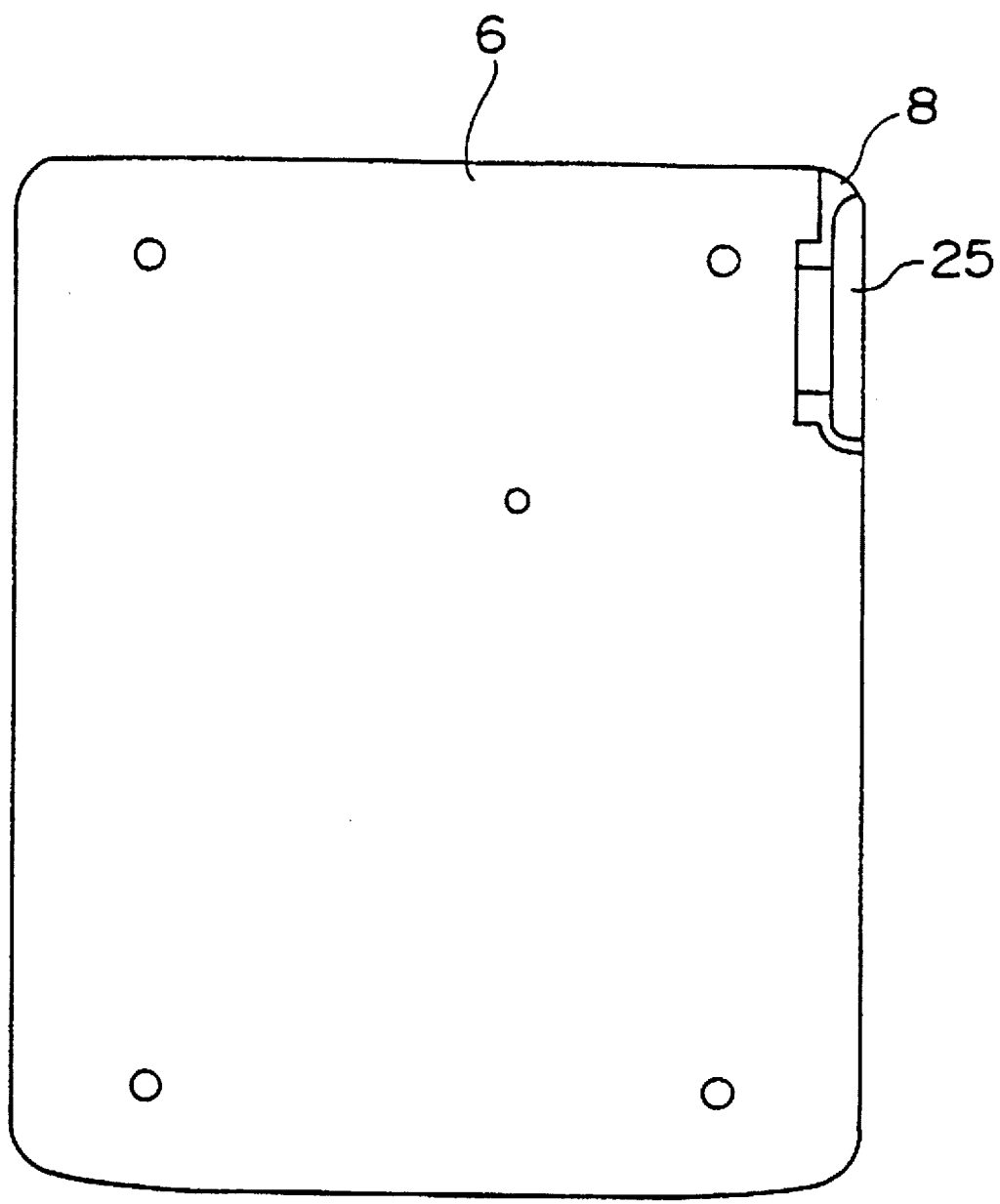
FIG. 7 is a bottom view of the recording and/or reproducing apparatus shown in FIG. 1.

The casing constituting the main body of the apparatus has connection jacks 36 to 40 for input/output of information signals, as shown in FIGS. 3 and 4. These connection jacks 36 to 40 are connected to an electronic circuit formed on an electronic circuit substrate.

Constitution of Disc Driving Unit

Figure 15:
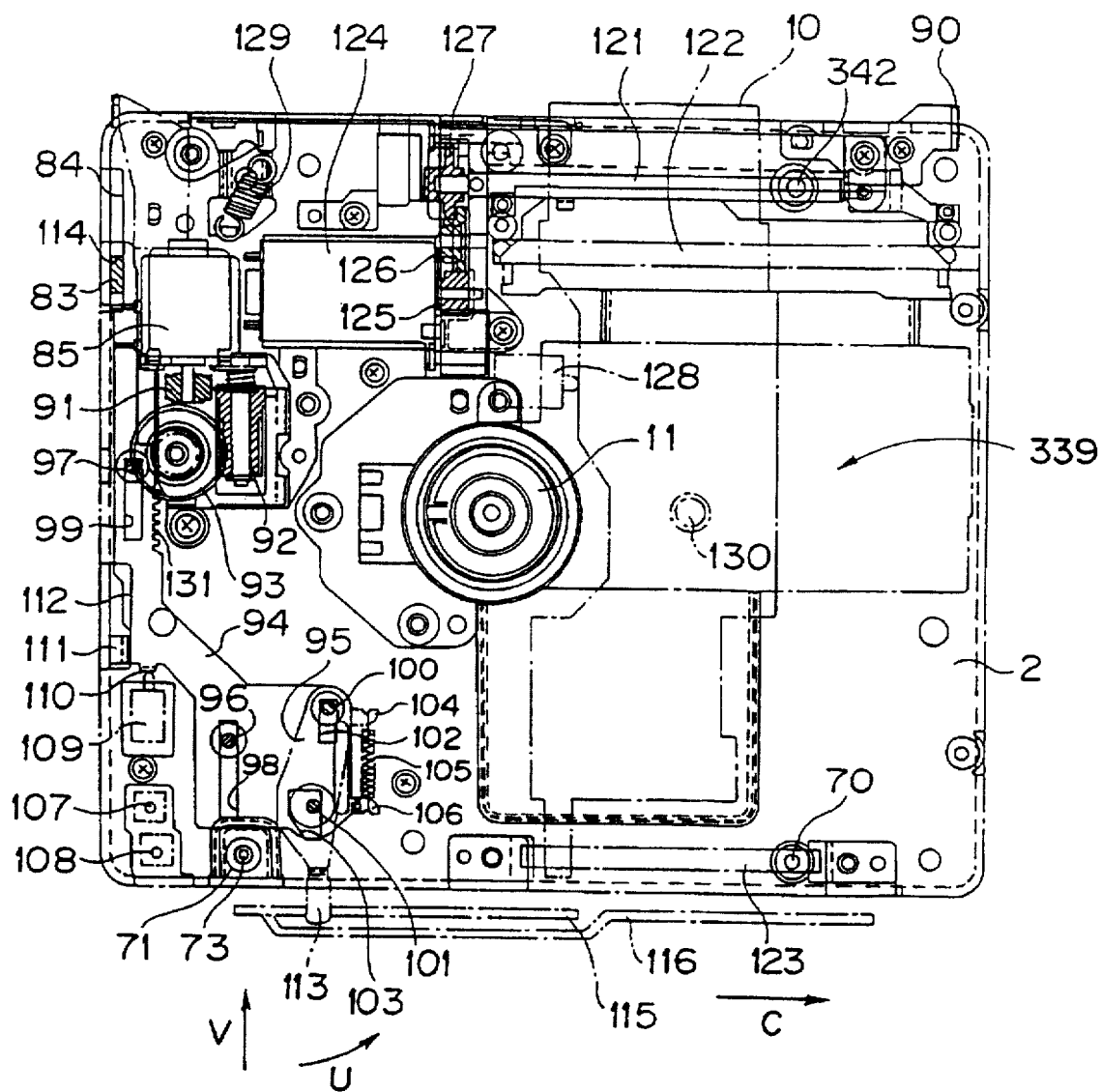
FIG. 15 is a plan view showing an inner construction of a mechanical chassis with the recording and/or reproducing apparatus in the stop mode.
Figure 16:
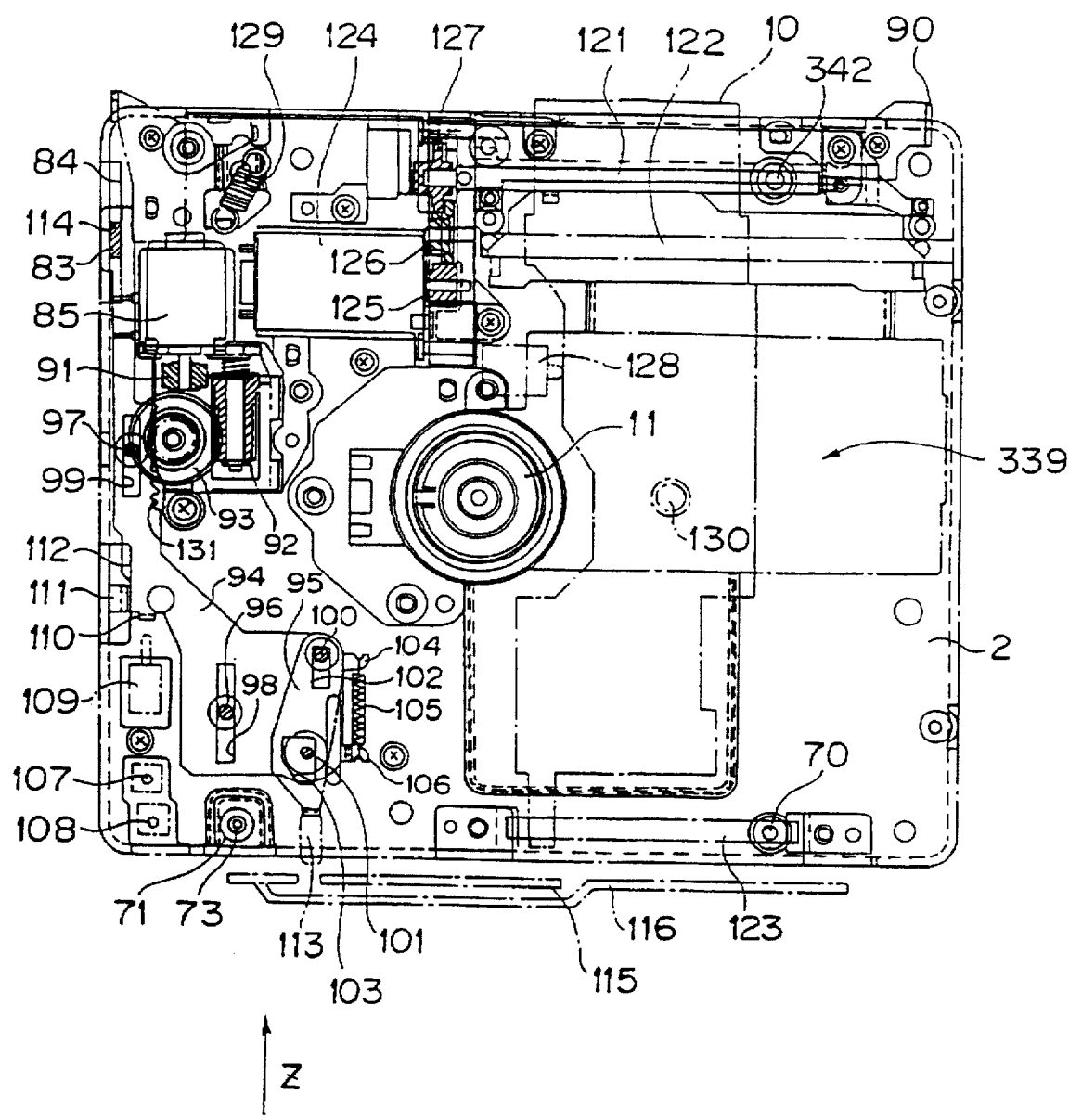
FIG. 16 is a plan view showing an inner construction of the mechanical chassis with the recording and/or reproducing apparatus in the playback mode.
Figure 17:
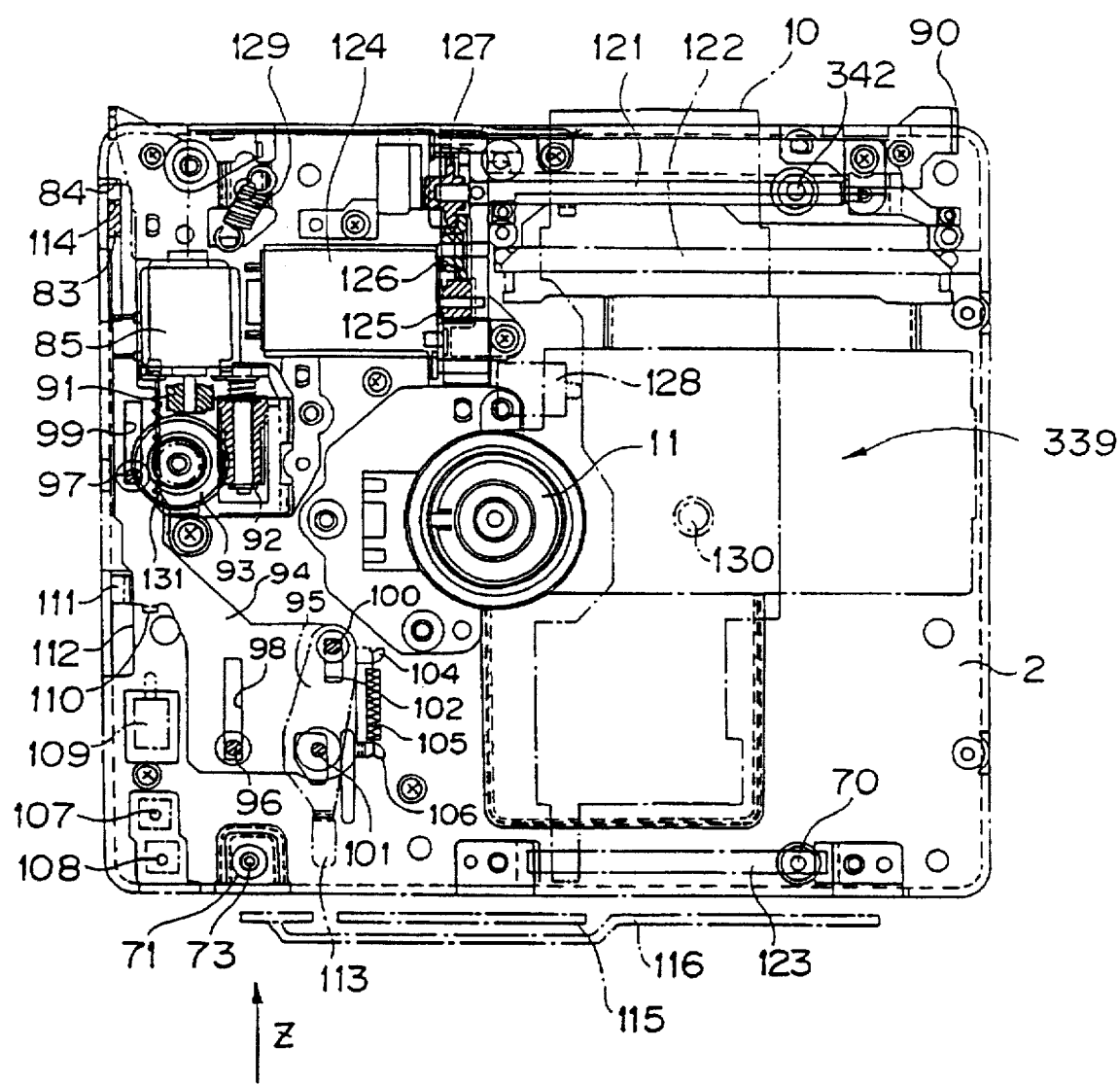
FIG. 17 is a plan view showing an inner construction of a mechanical chassis with the recording and/or reproducing apparatus in the recording mode.

The base member 2 is formed of metal or the like material substantially as a planar plate, as shown in FIGS. 15 to 17. On the base member 2 is formed a disc driving unit 339. At a mid portion on the lower surface of the base member 2 is mounted a spindle motor 89 with its driving shaft directed upwards. The driving shaft of the spindle motor 89 is projected above the base member 2 via a through-hole formed at a mid portion of the base member 2. A disc table 11 is mounted on the driving shaft of the spindle motor 89. The disc table 11 is formed substantially as a disc on the upper surface of which is formed a frusto-conical centering member engaged in a chuck hole of the magneto-optical disc 200 or the optical disc 201. On the upper surface of the disc table 11 provided with the centering member, there is provided a magnet for attracting a chuck plate 202. When the mid portion of the magneto-optical disc 200 or the optical disc 201, inclusive of the chuck hole 204, is set on the disc table 11, the centering member is fitted in the chuck hole 204, at the same time as the chuck plate 202 is attracted by the magnet for holding the magneto-optical disc 200 or the optical disc 201 in position. At this time, the magneto-optical disc 200 or the optical disc 201 is positioned with the center of the chuck hole 204 aligned with the center axis of the driving shaft of the spindle motor 89. The spindle motor 89 produces the rotation of the magneto-optical disc 200 or the optical disc 201 along with the disc table 11.

The optical pickup 10 is mounted on the base member 2 having an optical block within which there are enclosed a semiconductor laser as a light source, a light receiving element such as a phototransistor, various optical devices for guiding a light beam outgoing from the semiconductor laser or an objective lens 130. The optical pickup 10 converges the light beam emanated from the semiconductor laser via the optical devices and the objective lens 130 on the signal recording layer of the magneto-optical disc 200 or the optical disc 201. The optical pickup 10 also guides the return light of the light beam radiated on the magneto-optical disc 200 or the optical disc 201 to the light receiving element via the objective lens 130 and the optical devices for detection by the light receiving element. The optical pickup 10 detects the light volume and the angle of rotation of the polarized light from the return light of the magneto-optical disc 200 or the optical disc 201 in order to read information signals recorded on the magneto-optical disc 200 or the optical disc 201.

The optical pickup 10 is positioned on one side of the spindle motor 89 and movably mounted via a pair of guide shafts 122, 123 parallel to each other on the lower surface of the base member 2, as shown in FIGS. 15 to 17. The optical pickup 10 is guided by these guide shafts 122, 123 so as to be moved towards and away from the spindle motor 89. The optical pickup 10 has the objective lens 130 exposed to above the base member 2 via a through-hole formed in the base member 2. The objective lens 130 faces the signal recording surface of the magneto-optical disc 200 or the optical disc 201. That is, the optical pickup 10 takes charge of radiation of the light beam for recording the information signals on the magneto-optical disc 200 held by and rotated on the disc table 11 and the readout of information signals recorded on the magneto-optical disc 200 or the optical disc 201.

On the lower surface of the base member 2, there is mounted an optical pickup feed motor 124 for feeding the optical pickup 10 under guidance by the guides shafts 122, 123, as shown in FIGS. 15 to 17. A driving gear 125 is mounted on a driving shaft of the optical pickup feed motor 124. The driving gear 125 meshes with a speed-reducing transmission gear 126 rotatably supported on the lower surface of the base member 2. The speed-reducing transmission gear 126 meshes with a follower gear 127 mounted on one end of a screw shaft 121 rotatably mounted on the lower surface of the base member 2 parallel to the guide shafts 122, 123, and causes the screw shaft 121 to be rotated about its axis via the follower gear 127. The screw shaft 121 has a male threaded portion on its outer peripheral surface meshing with the optical block of the optical pickup 10. That is, when the pickup feed motor 124 is run in rotation, the screw shaft is run in rotation for moving the optical pickup 10 along the guide shafts 122, 123.

In the vicinity of the spindle motor 89, there is mounted an inner peripheral position detection switch 128 which is pushed and actuated by the optical block of the optical pickup 10 when the optical pickup 10 is closest to the spindle motor 89 within the range of movement of the optical pickup 10, that is when the optical pickup 10 is at the radially innermost position of the magneto-optical disc 200 or the optical disc 201, as shown in FIGS. 15 to 17.

Figure 20:
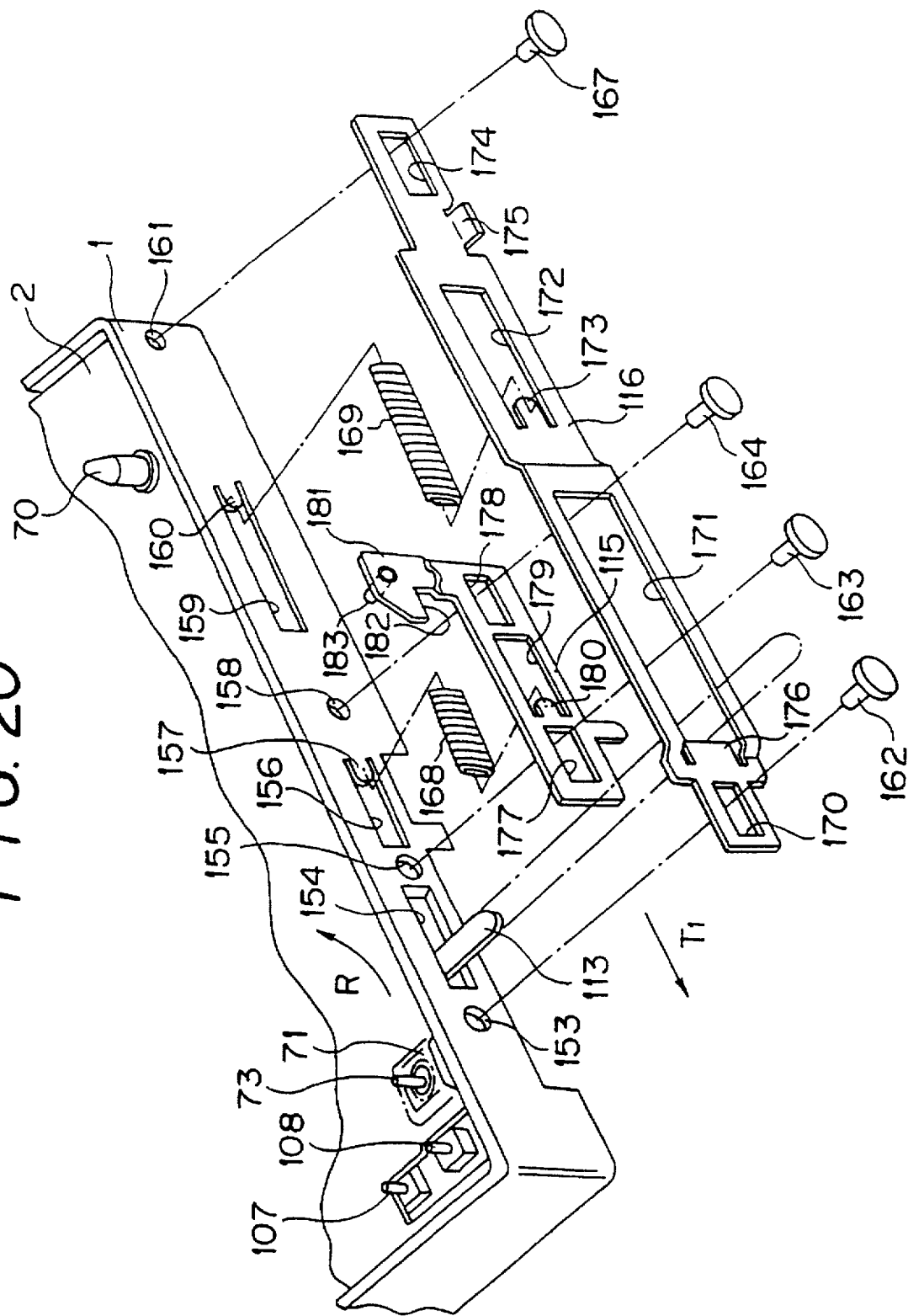
FIG. 20 is an enlarged exploded perspective view showing essential portions of an arrangement for retaining an upper lid of the recording and/or reproducing apparatus.

On the upper surface of the base member 2, there are implanted paired positioning pins, that is a forward positioning pin 70 and a rear positioning pin 342, at offset positions near the forward and rear edges of the base member 2, as shown in FIGS. 15 to 17. The forward positioning pin 70 is substantially frusto-conical and tapered towards its distal end, as shown in FIG. 20. The rear positioning pin 342 is similarly substantially frusto-conical in profile. When the recording/reproducing disc cartridge 220 or the replay-only disc cartridge 221 is set on the loading unit on the cartridge main body 205 or 216, these positioning pins 70, 342 are engaged in positioning holes 209, 210 formed in the cartridge main body 205 or 216 for positioning the disc cartridge 220 or 221 with respect to the base member 2. At an offset position near the forward edge of the base member 2, there is formed a height position setting boss 71, as shown in FIGS. 12 and 20. The height position setting boss 71 is formed by extending a part of the base member 2 upwards. The height position setting boss 71 is caused to bear against the lower major surface of the cartridge main body 205 or 216 set on the base member 2 for positioning the cartridge main body 205 or 216. Below the height position setting boss 71 is mounted a cartridge loading detection switch 72. The cartridge loading detection switch 72 has a pusher 73 projected above the upper surface of the height position setting boss 71 via a through-hole formed in the height position setting boss 71. When the lower major surface of the cartridge main body 205 or 216 is caused to bear against the upper surface of the height position setting boss 71, the cartridge loading detection switch 72 has its pusher 73 thrust by the major surface for detecting that one of the disc cartridges 220, 221 has now been loaded.

In the vicinity of the cartridge loading detection switch 72 provided on the base member 2, there are mounted plural discrimination switches 107, 108 for detecting the discrimination holes 224 formed in the disc cartridge 220 or 221. These discrimination switches 107, 108 are thrust when the discrimination holes 224 are of shallow depth and are not thrust if these holes are of deeper depth.

On the base member 2, when the disc cartridge 220 or 221 is set on the cartridge loading unit, the cartridge main body 205 or 216 is positioned by the positioning pins 70, 342 and the height position setting boss 71, both in the horizontal direction and in the height direction, while the magneto-optical disc 200 or the optical disc 201 is held in position on the disc table 11. At this time, the cartridge loading detection switch 72 detects the loading of the disc cartridge 220 or 221, while the discrimination switches 107, 108 detect the state of the discrimination holes 224. The cartridge loading detection switch 72 is connected as a switch A to the CPU 338, as shown in FIG. 36.

When the disc cartridge 220 or 221 is loaded in position on the cartridge loading unit, the magneto-optical disc 200 or the optical disc 201 is enabled to be rotated within the cartridge main body 205 or 216 without being contacted with the inner wall of the cartridge main body 205 or 216.

Arrangement for Supporting the Magnetic Head

On the optical pickup 10 is mounted a magnetic head 13 via a connecting arm 12, a magnetic head supporting plate 132 and a magnetic head supporting arm 77, as shown in FIGS. 12 to 14, 18 and 19.

Figure 13:
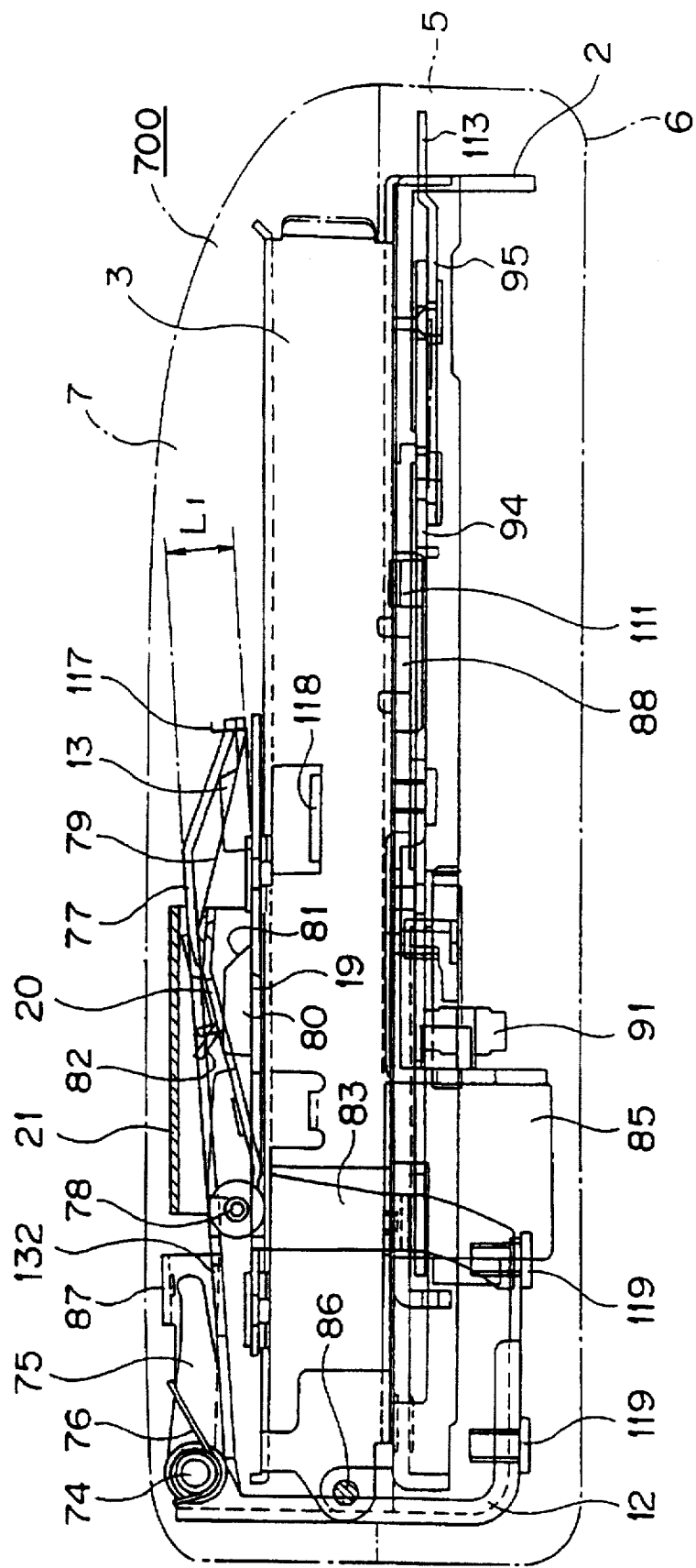
FIG. 13 is a left-hand side view showing an inner construction of the recording and/or reproducing apparatus in the stop state.
Figure 14:
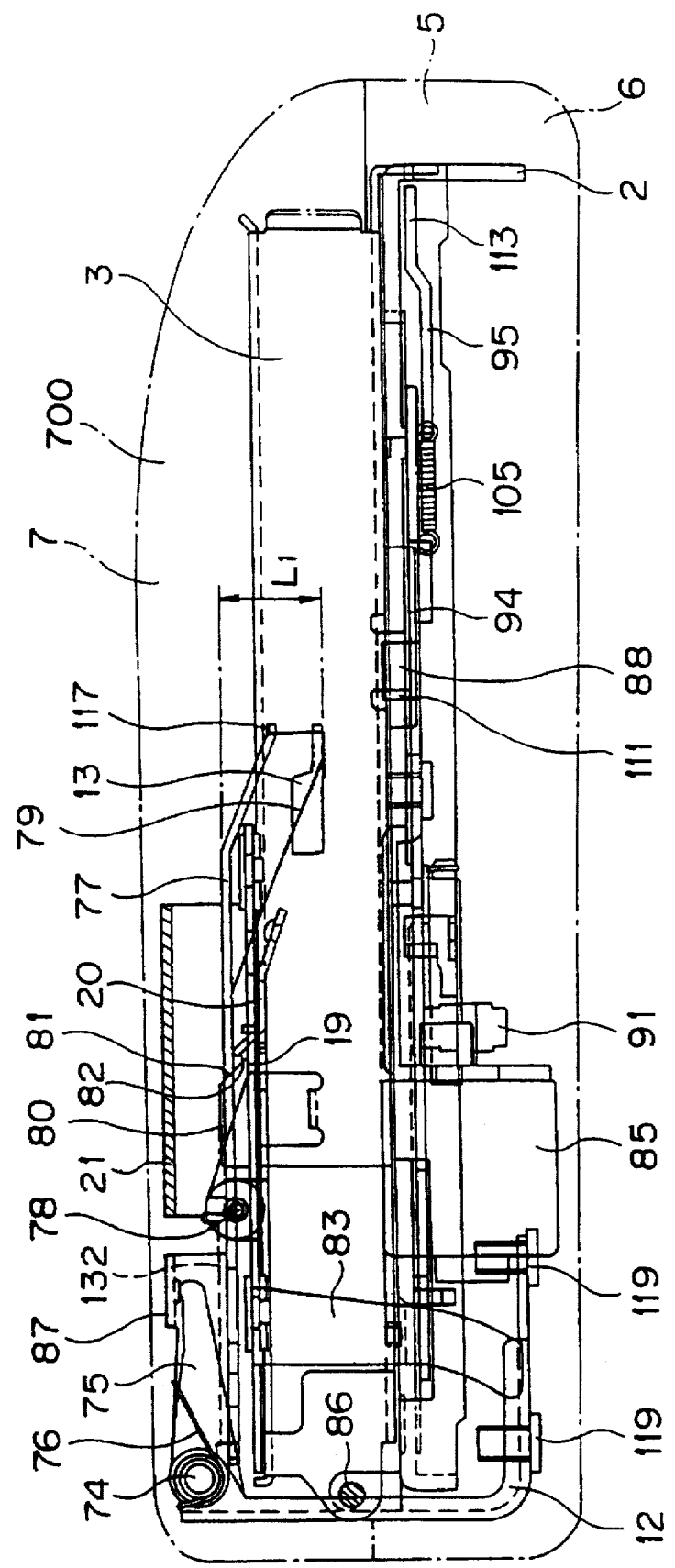
FIG. 14 is a left-hand side view showing an inner construction of the recording and/or reproducing apparatus in the stop state.
Figure 18:
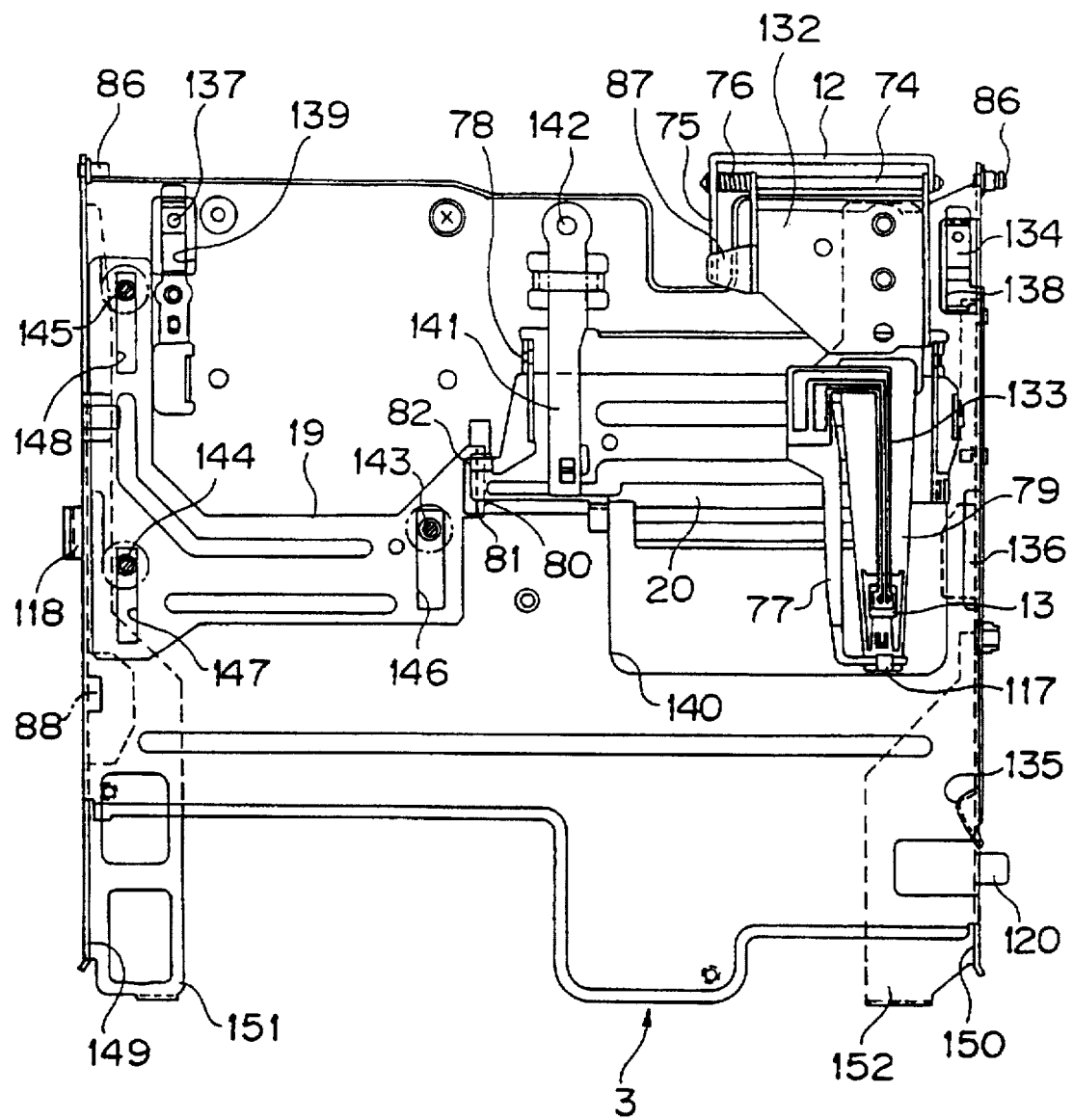
FIG. 18 is a plan view showing a cartridge holder with the recording and/or reproducing apparatus in the stop mode and in the playback mode.
Figure 19:
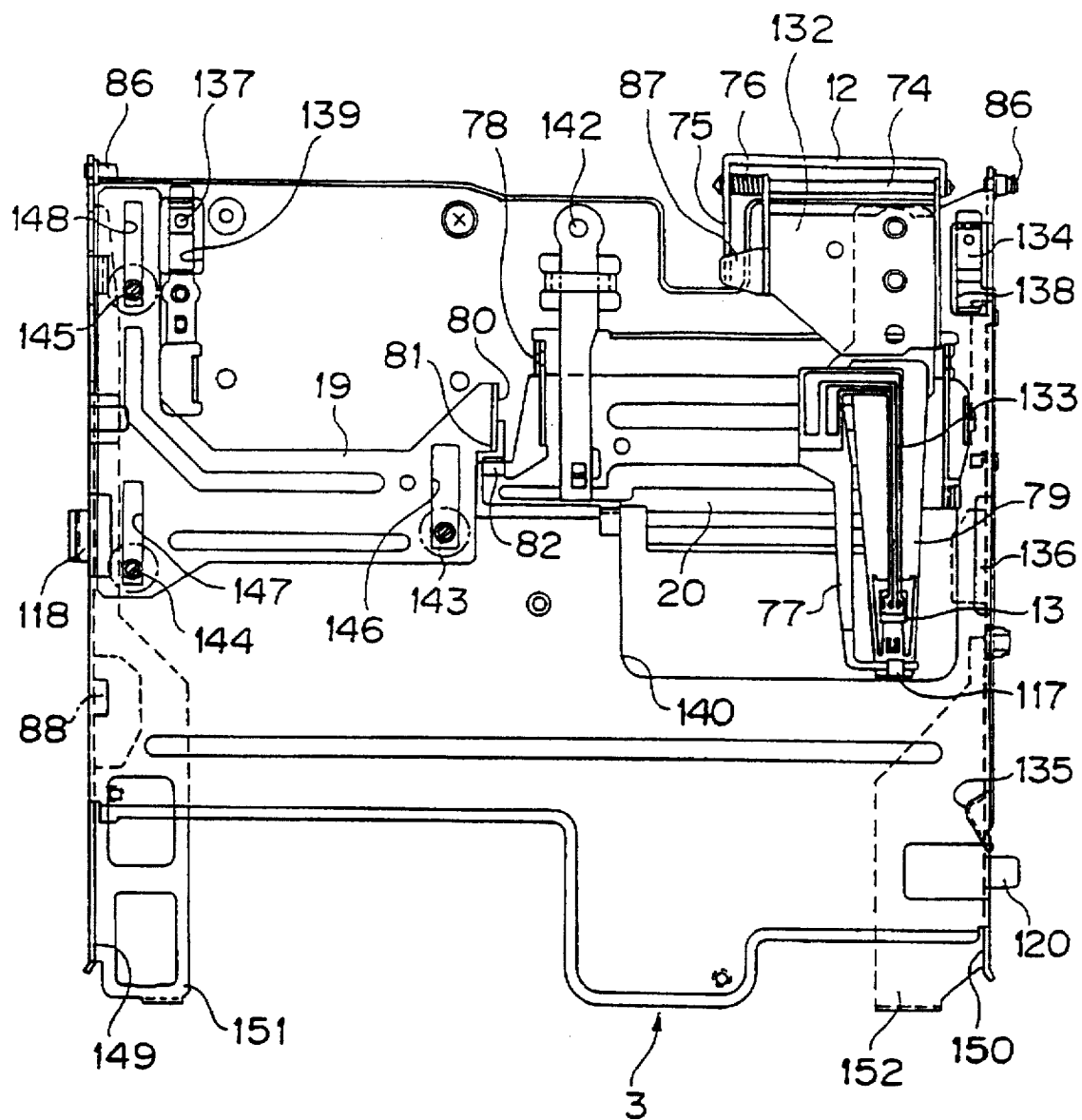
FIG. 19 is a plan view showing a cartridge holder with the recording and/or reproducing apparatus in the recording mode.

The connecting arm 12 is substantially L-shaped and has its one end mounted on the optical block of the optical pickup 10 by set screws 119, 119, while having its other end directed upwards at the rear end of the optical block, as shown in FIG. 13. The other end of the connecting arm 12 is located more rearwardly than the rear edge of the base member 2, as shown in FIGS. 18 and 19, and is moved together with the optical pickup 10 without being abutted against the base member 2. The connecting arm 12 has its other end projected above the upper surface of the base member 2. In the vicinity of the other upper end of the connecting arm 12 is rotatably mounted a rear edge portion of the magnetic head supporting plate 132 via a pivot 74. The magnetic head supporting plate 132 has its forward side directed forwards, and has the forward edge rotatable in a direction towards and away from the base member 2, as shown in FIGS. 12 to 14. A positioning lug 87 is projected from near the other end of the connecting arm 12. The positioning lug 87 is located above the positioning arm 75 and positioned by having its downward travel inhibited on abutment against the end region of the positioning arm 75, as shown in FIGS. 12 to 14. A magnetic head supporting arm 77 is supported by having its distal end directed forwards and has a portion near its distal end bent in the lateral direction as shown in FIGS. 12 to 14. A gimbal spring 79 has its proximal end mounted on the magnetic head supporting plate 132. The magnetic head 13 is mounted on the distal end of the gimbal spring 79, part of which is bent to form a retention support 117. The retention support 117 is engaged with the bent portion in the vicinity of the distal end of the magnetic head supporting arm 77, as shown in FIGS. 12 to 14.

The magnetic head 13, thus supported, is located above the objective lens 130 of the optical pickup 10, and faced by the optical pickup 10. The magnetic head 13 is also movable in the up-and-down direction for being contacted with or separated from the base member 2, by the magnetic head supporting plate 132 being rotated relative to the connecting arm 12. The magnetic head 13 is also positioned in the downward direction by abutment of the positioning lug 87 with the positioning arm 75. A torsion coil spring 76 is placed around one end of the pivot 74. The torsion coil spring 76 has its coil part interposed between the proximal portion of the positioning arm 75 and the magnetic head supporting plate 132, while having its arm sections retained by the positioning arm 75 and the magnetic head supporting plate 132, as shown in FIGS. 12 to 14. Thus the torsion coil spring thrusts magnetic head supporting plate 132 towards the opposite lateral side of the connecting arm 12 for lateral positioning of the magnetic head supporting plate 132, while rotationally biasing the magnetic head supporting plate 132 relative to the connecting arm 12 in a direction in which the magnetic head 13 is moved downwards. The magnetic head 13 is fed with electric current via a flexible printed circuit board 133 extended between the proximal ends of the magnetic head 13 and the magnetic head supporting arm 77.
Constitution of Cartridge Holder On the upper surface of the base member 2 is mounted a cartridge holder 3 into which is introduced the disc cartridge 220 or 221. In order to allow the disc cartridge 220 or 221 to be inserted from the forward side and to hold thus inserted disc cartridge 220 or 221, the cartridge holder 3 has a top plate, left-hand and right-hand sidewall sections 149, 150 depending from both lateral side edges of the top plate and support pieces 151, 152 bent inwards from the lower ends of the sidewall sections, as shown in FIGS. 12 to 14, 18 and 19. The cartridge holder 3 is formed by bending a one-piece metal sheet material. With the cartridge holder 3, the disc cartridge 220 or 221 is introduced from the forward side opening into a space between the lower sidewall sections 149, 150 below the top plate in a direction indicated by arrow in FIG. 8 so as to be held and supported at lateral sections of the lower major surface thereof. At this time, the disc cartridge 200 or 201 has the lower major surface facing downwards, substantially in its entirety, with the chuck aperture 213, aperture 222 for the optical pickup, positioning holes 209, 210 and the discriminating holes 224 facing the lower side of the cartridge holder 3.

At a mid portion of one of the sidewall section 150 of the cartridge holder 3, there is protuberantly mounted a shutter opening piece 136, directed towards the inner side of the cartridge holder 3, as shown in FIGS. 18 and 19. When the disc cartridge 220 or 221 is inserted into the cartridge holder 3, the shutter opening piece 136 is caused to bear against the forward end face of the connecting web portion or supporting portion of the shutter member 206 or 217 for moving the shutter member 206, 217 as the disc cartridge 220 or 221 is introduced into the cartridge holer 3 for opening the apertures 213, 222, 223 formed in the cartridge main body 205 or 216. On the forward lateral side of the sidewall section 150 of the cartridge holder 3, there is provided a shutter closure member 135 of an elastic material, such as plate spring, for extending towards the inside of the cartridge holder 3, as shown in FIGS. 18 and 19. When the disc cartridge 220 or 221 is introduced into the cartridge holder 3, the shutter closure member 135 is engaged in a shutter closure opening 208 of the shutter member 206 or 217 and, when the disc cartridge 220 or 221 is extracted from the cartridge holder 3, shifts the shutter member 206 or 217 in a direction of closing the apertures 213, 222, 223 formed in the cartridge main body 205 or 216.

A pair of retention springs 134, 137 are mounted on both sides on the rear lateral side of the top plate of the cartridge holder 3. Each of the retention springs 134, 137 has its proximal end secured to the upper surface of the top plate while having its proximal end directed towards the rear. The foremost parts of these retention springs 134, 137 are projected via through-holes 138, 139 formed in both sides on the rear lateral side of the top plate towards below the top plate, that is into the inside of the cartridge holder 3, as shown in FIGS. 18 and 19. Thus the retention springs 134, 137 thrust and support the upper major surface of the disc cartridge 220 or 221 introduced into the cartridge holder 3.

On both rear lateral sides of the cartridge holder 3 are mounted left-hand and right-hand side pivots 86, 86 having their axes running parallel to the rear edge of the cartridge holder 3. These pivots 86, 86 are passed through left-hand and right-hand side bearing members 98, 90 mounted near the rear side of the base member 2, as shown in FIGS. 15 to 17, so that the cartridge holder 3 is supported for rotation about these pivots 86, 86 as the center of rotation. When the disc cartridge 220 or 221 is introduced into and held by the cartridge holder 3 which is rotated upwards so as to be spaced apart from the base member 2, as shown in FIG. 12, and subsequently the cartridge holder 3 is rotated downwards as shown in FIG. 13 so as to be set on the base member 2, the disc cartridge 220 or 221 held by the cartridge holder is loaded in the cartridge loading position on the base member 2. Thus the disc cartridge 220 or 221, loaded on the base member 2, is thrust towards and supported by the retention springs 134, 137.

The magnetic head supporting plate 132 and the magnetic head supporting arm 77 are positioned above the cartridge holder 3. In the top plate of the cartridge holder 3, thee is bored a through-hole 140 in register with the range of possible movement of the magnetic head supporting arm 77 and the gimbal spring 79 accompanying the movement of the optical pickup 10, as shown in FIGS. 18 and 19. That is, the magnetic head 13 faces the upper surface of the disc cartridge 220 or 221 held within the cartridge holder 3 via the through-hole 140.

Figure 28:
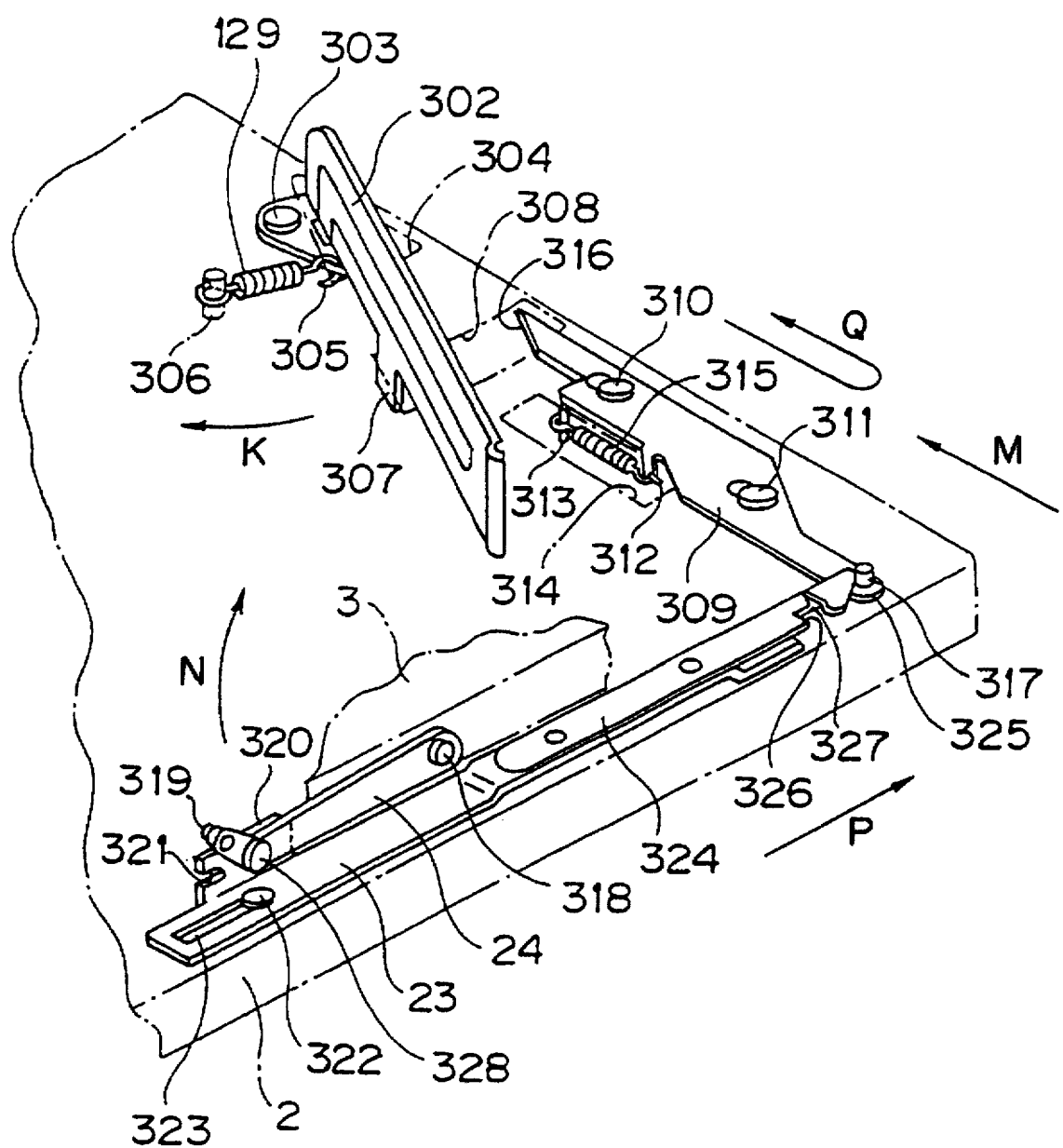
FIG. 28 is an enlarged perspective view showing a cartridge ejection mechanism.
Figure 29:
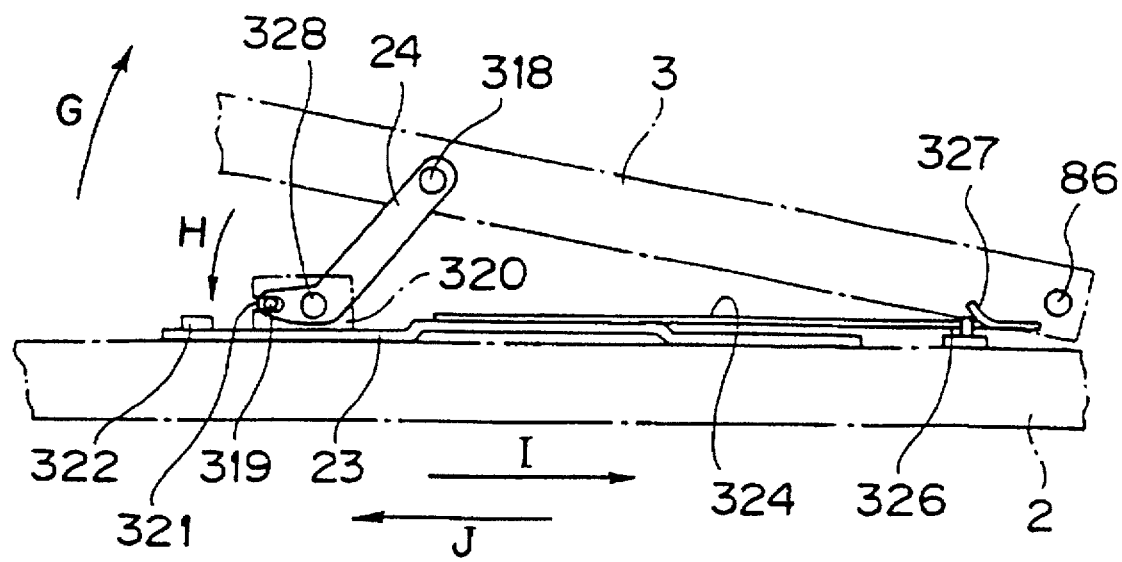
FIG. 29 is right-hand side view showing the mounting stat between the mechanical chassis and the cartridge holder.
Figure 30:
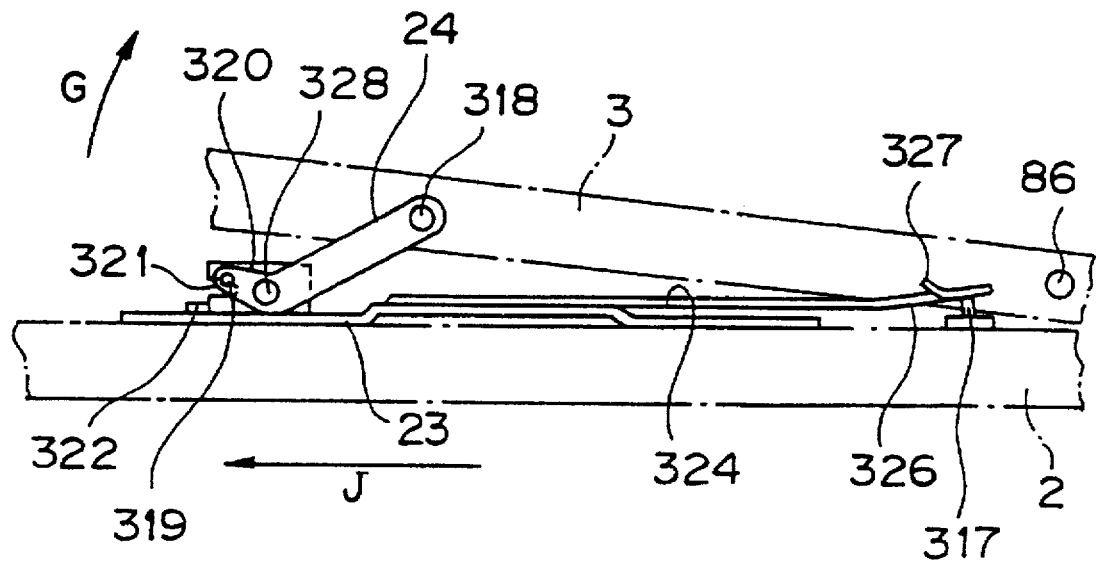
FIG. 30 is a right-hand side view schematically showing the state in which the cartridge holder is being rotated towards the mechanical chassis.

On a lateral surface, that is an outer surface of the sidewall section 150 of the cartridge holder 3, a first click stop link 24 has its proximal end rotatably mounted via a pivot 318, as shown in FIGS. 28 to 30. The first stop clink link 24 has its distal end directed forwards and is rotatably mounted on a click stop lever 23 movably mounted near a lateral edge on the upper surface of the base member 2. That is, the click stop lever 24 has its longitudinal direction as the fore-and-aft direction and has a support pin 322 set on the base member 2 introduced into an oblong hole 323 having its long axis extending in the longitudinal direction so that the click stop lever 24 is slidable in the fore-and-aft direction. The click stop lever 23 has a supporting piece 320 bent upwards and the first click stop link 24 has its distal end mounted via a pivot 328 relative to the supporting piece 320. The foremost end of the first stop link 24 beyond the pivot 328 is formed with a click stop boss 319, while the supporting piece 320 is formed with a click stop groove 321.

When the cartridge holder 3 is rotated upwards as indicated by arrow G in FIG. 29, the click stop lever 23 is slid rearwards via the first click stop link 24, as indicated by arrow I in FIG. 29. The click stop boss 319 is then moved from above the supporting piece 320 as indicated by arrow H in FIG. 29 to laterally of the supporting piece 320 while elastically deforming the distal end of the first click stop link 24. When the cartridge holder 3 is rotated halfway, the click stop boss 319 is engaged in the click stop groove 321. The cartridge holder 3 is held at this time at a position spaced apart from the base member 2, as shown in FIG. 30. When the cartridge holder 3 is rotated towards the mechanical chassis in a direction opposite to that shown by arrow G in FIG. 29, the click stop boss 319 is disengaged from the click stop groove 321 so that the click stop lever 23 is slid in a forward direction indicated by arrow J in FIG. 29 and thus restored to its initial position.

Disc Cartridge Ejection Mechanism

On the rear side on the upper surface of the base member 2, there is mounted a disc cartridge ejection mechanism for ejecting the disc cartridge 220 or 221 so far held in the cartridge holder 3 in a forward direction. The disc cartridge ejection mechanism has a cartridge ejection lever 302 rotatably mounted on the rear side of the base member 2 and an ejection lever lock lever 309, for locking the cartridge ejection lever 302 at the rear position, as shown in FIG. 28.

The cartridge ejection lever 302 has its proximal end projected below the base member 2 via a through-hole 304 formed near the rear edge of the base member 2 and has its proximal end supported via a pivot 303 for rotation relative to the lower surface of the base member 2. An engagement lug 307 is formed on the lower edge of a mid portion of the cartridge ejection lever 302 for extending downwards into an arcuate slit 308 formed in the base member 2. The cartridge ejection lever 302 has its range of rotation delimited by a slit 308 so that it is rotatable from a position in which its distal end is directed obliquely forwards to a position in which the distal end is directed laterally along the rear edge of the base member 2. A tension coil spring 129 is mounted between a spring retainer 305 provided on the proximal end of cartridge ejection lever 302 and a spring retainer lug 306 provided on the lower surface of the base member 2. The tension coil spring 129 rotationally biases the distal end of the cartridge ejection lever 302 in a forward direction as indicated by arrow K in FIG. 28.

The ejection lever lock lever 309 is supported laterally slidably by supporting pins 310, 311 implanted on the upper surface of the base member 2, as shown in FIG. 28. The ejection lever lock lever 309 has its one end facing the rear end of a lock release spring 324 mounted on the click stop lever 23 for being extended rearwards from the click stop lever 23, while having its other end facing the rear end of a slit 308 engaged by the engagement lug 307. The lock release spring 324 has its rear end elastically deflectable upwards and has its rear end portion located on the upper surface of the ejection lever lock lever 309. The lock release lever 324 has its rear end as a tapered portion 325 inclined towards one lateral side and having a cut-out 326 opened towards one lateral side and an inclined edge 327 provided at the rear edge of the cut-out 326. The other end of the ejection lever lock lever 309 is formed with a tapered portion 316 inclined towards the engagement lug 307. The ejection lever lock lever 309 is biased towards the opposite lateral side as indicated by arrow M in FIG. 28, that is towards the slit 308, by a tension coil spring 315 mounted between a spring retainer 313 and a spring retainer lug 313 provided on the base member 2.

In an initial state of the cartridge ejection mechanism, in which the cartridge holder 3 is positioned towards the base member 2, as shown in FIG. 28, the cartridge election lever 302 is located forwards, while the lock release spring 324 and the clock stop lever 23 are also located forwards. When the cartridge holder 3 is rotated upwards as indicated by arrow N in FIG. 28, the lock release spring 324 is moved rearwards as indicated by arrow P in FIG. 28. At this time, the lock release spring 324 thrusts the lock release pin 317 towards one lateral side by its tapered portion 325 for sliding the ejection lever lock lever 309 towards a lateral side against the bias of the tension coil spring 315. When the cartridge holder 3 is rotated a pre-set angle, the lock release spring 324 shifts the cut-out 326 to a position registering with the lock release pin 317. The election lever lock lever 309 causes the lock release pin 317 to be intruded into the cut-out 326 so that the initial state is again established.

When the disc cartridge 220 or 221 is introduced into the cartridge holder 3, the disc cartridge 220 or 221 thrusts the foremost part of the cartridge ejection lever 302 for rotating the cartridge ejection lever 302 in a direction opposite to that indicated by arrow K in FIG. 28 against the bias of the tension coil spring 129. When the cartridge ejection lever 302 is rotated rearwards, the engagement lug 307 thrusts the tapered portion 316 formed at the opposite end of the ejection lever lock lever 309 for sliding the ejection lever lock lever 309 towards the above-mentioned lateral side. The ejection lever lock lever 309 is slid once towards the above-mentioned lateral side as indicated by arrow Q in FIG. 28. However, when the disc cartridge 220 or 221 is fully introduced into the cartridge holder 3, and the cartridge ejection lever 302 reaches the rear position, the engagement lug 307 reaches a position further rearward than the opposite lateral side of the ejection lever lock lever 309, so that the initial position is again established. The cartridge ejection lever 302 is locked at the rear position.

When the cartridge holder 3 is rotated towards the base member 2, the lock release lever 324 is moved forwards as it is elastically deformed towards the upper side, with the inclined edge 327 in sliding contact with the upper end of the lock release pin 317, as shown in FIG. 30. Consequently, the ejection lever lock lever 309 is not slid. If the cartridge holder 3 holds at this time the disc cartridge 220 or 221, the disc cartridge 220 or 221 is held within the cartridge holder 3 and moved in this state towards the base member 2.

When the cartridge holder 3 holding the disc cartridge 220 or 221 is rotated upwards away from the base member 2, the ejection lever lock lever 309 is slid once towards the above-mentioned lateral side during the rotation of the cartridge holder 3 as indicated by arrow Q in FIG. 28. When the ejection lever lock lever 309 is slid in this manner towards the above-mentioned lateral side, the ejection lever lock lever 309 is unlocked so that the cartridge ejection lever 302 is rotated forwards as indicated by arrow K in FIG. 28, under the bias of the tension coil spring 129, for ejecting the disc cartridge 220 or 221 forwardly of the cartridge holder 3.

Constitution of Lifting the Magnetic Head

With the present recording and/or reproducing apparatus, the lifting of the magnetic head 13 is taken charge of by a magnetic head lifting plate 20 mounted on the upper surface of the cartridge holder 3 and a magnetic head lifting lever 94 mounted on the lower surface of the base member 2 for sliding a transmission lever 19.

The magnetic head lifting plate 20 is mounted below the magnetic head supporting arm 77 and the gimbal spring 79 for closing the rear portion of a cut-out 140, as shown in FIGS. 12 to 14, 18 and 19. The magnetic head lifting plate 20 has its rear edge portion rotatably supported via pivot 78 relative to the top plate of the cartridge holder 3 so that its forward side is movable in the vertical direction. When rotated upwards, the magnetic head lifting plate 20 thrusts the gimbal spring 79 towards the magnetic head supporting arm 77, while rotating the gimbal spring 79 and the magnetic head supporting arm 77 about the pivot 74 as the center of rotation, as shown in FIGS. 12 an 13. When rotated downwards, the magnetic head lifting plate 20 has a portion of its forward edge abutted against the top plate of the cartridge holder 3 so as to be positioned substantially in flush with the top plate. At this time, the magnetic head supporting arm 77 is rotated downwards until the positioning lug 87 is caused to bear against the positioning arm 75. On the other hand, the gimbal spring 79 is lowered below the magnetic head supporting arm 77 until an engagement support 117 is hung from the bent distal end of the magnetic head supporting arm 77. Thus the distance $L_1$ from the lower surface of the magnetic head 13 as far as the upper surface of the magnetic head supporting arm 77 as shown in FIG. 13 is shorter than the distance $L_1$ from the lower surface of the magnetic head 13 as far as the upper surface of the magnetic head supporting arm 77 when the magnetic head lifting plate 20 has been rotated downwards, as shown in FIG. 14. The magnetic head lifting plate 20 has its proximal end rotationally biased downwards by the foremost part of a plate spring 141 mounted by a mounting pin 142 on the upper surface of the cartridge holder 3. That is, the plate spring 141 has its foremost part set on the magnetic head lifting plate 20, as shown in FIG. 18.

The transmission lever 19 is mounted on the opposite lateral side on the upper surface of the cartridge holder 3 for sliding in the fore-and-aft direction, as shown in FIGS. 13 and 14. The transmission lever 19 has parallel support grooves 146, 147 engaged by support pins 143, 144, projected on the upper surface of the cartridge holder 3, respectively. The transmission lever 19 has a lifting lug 80 at its lateral side, that is a portion thereof located at a mid part of the cartridge holder 3 for facing the opposite lateral side of the magnetic head lifting plate 20. The forward end of the lifting lug 80 is a tapered portion 81 inclined upwards. The lower surface on the opposite lateral side of the magnetic head lifting plate 20 is formed with an inclined surface 82 registering with the lifting lug 80. The inclined surface 82 is formed as a rearwardly inclined tapered portion by having a portion of the magnetic head lifting plate 20 segmented and bent in the upward direction.

When shifted towards the front side from the rear side, the transmission lever 19 causes the lifting lug 80 to be intruded into a space between the magnetic head lifting plate 20 and the upper surface of the cartridge holder 3 as the tapered portion 81 has a sliding contact with the inclined surface 82 of the magnetic head lifting plate 20. The magnetic head lifting plate 20 is rotated upwards against the bias of the plate spring 141, as shown in FIG. 13. When moved from the front side towards the rear side, the transmission lever 19 causes the lifting lug 80 to be receded rearwards via a space between the magnetic head lifting plate 20 and the upper surface of the cartridge holder 3 as the tapered portion 81 has a sliding contact with the inclined surface 82 of the magnetic head lifting plate 20. This rotates the magnetic head lifting plate 20 downwards under the bias of the plate spring 141 for re-establishing the initial position. The transmission lever 19 has a connecting arm 83 at its opposite lateral side for depending towards the base member 2, as shown in FIGS. 12 to 14. The connecting arm 83 is protruded below the base member 2 via a through-hole 84 formed near the opposite lateral side of the base member 2.

A magnetic head lifting lever 94 is mounted on the opposite lateral side on the lower surface of the base member 2 for sliding in the fore-and-aft direction, as shown in FIGS. 15 to 17. The magnetic head lifting lever 94 has parallel support grooves 98, 99 engaged by support pins 96, 97 set upright on the lower surface of the mechanical chassis 2, respectively. The magnetic head lifting lever 94 is moved in the fore-and-aft direction, responsive to the operating mode of the recording and/or reproducing apparatus by a stepping motor 85 controlled by the CPU 338. The stepping motor 85 is mounted at a rear portion on the lower surface of the base member 2. A driving gear 91 is mounted on a driving shaft of the stepping motor 85. The driving gear 91 meshes with a first transmission gear 92 rotatably supported on the lower surface of the base member 2. The first transmission gear 92 meshes with a worm wheel of a second transmission gear 93 rotatably mounted on the lower surface of the base member 2. The second transmission gear 93 has a pinion gear meshing with a rack gear 131 provided on the magnetic head lifting lever 94.

The magnetic head lifting lever 94 is moved in the fore-and-aft direction under the driving force of the stepping motor 85 which is driven by being fed with driving pulses from the CPU 338 and thereby run in rotation an angle corresponding to the number of supplied pulses.

The rear end of the magnetic head lifting lever 94 has an engagement opening 114 in register with the through-hole 84. In the engagement opening 114 is engaged the connecting arm 83 of the transmission lever 19 via the through-hole 84. When the transmission lever 94 is slid in the fore-and-aft direction, the transmission lever 19 is moved in the fore-and-aft direction on the cartridge holder 3. Since the magnetic head lifting plate 20 is additionally rotated, the magnetic head 13 is lifted in an up-and-down direction. The connecting arm 83 is formed substantially arcuately about the pivot 86 of the cartridge holder 3 as the center of the arc, such that the connecting arm 83 is perpetually engaged in the engagement opening 114 even when the cartridge holder 3 is rotated about the pivot 86 as the center of rotation.

At a mid portion of the magnetic head lifting lever 94, there is provided a forwardly directed planar switch actuating piece 110. On the lower surface of the base member 2, there is mounted, in register with the switch actuating piece 110, a detection switch 109 for detecting the initial position of the magnetic head lifting lever 94. The initial position detection switch 109 is thrust by the switch actuating piece 110 when the magnetic head lifting lever 94 is moved to the forward initial position, and transmits to the CPU 338 a detection signal indicating that the lever 94 is in its initial position. When the magnetic head lifting lever 194 is at the initial position, the transmission lever 19 has been shifted to its initial position, so that the magnetic head 13 is held at its upper position. The position of the magnetic head lifting lever 94 may be found by counting the number of pulses supplied to the stepping motor 85 after outputting of the detection signals from the initial position detection switch 109.

The opposite lateral side of the magnetic head lifting lever 94 is formed with a retention protrusion 111 which is extended towards a lateral guide portion, as shown in FIGS. 15 to 17. The retention protrusion 111 faces the upper side via a through-hole 112 formed near the opposite lateral side of the base member 2. A retention pawl 88 is formed at the lower edge of the sidewall section 149 of the cartridge holder 3, as shown in FIGS. 18 and 19. The retention pawl 88 is hook-shaped, that is, its lower end projected towards the lower side is bent inwards, so that, when the cartridge holder 3 is rotated downwards and set on the base member 2, the retention pawl 88 is projected below the base member 2 via the through-hole 112. When protruded into the through-hole 112, the retention pawl 88 is positioned at back of the retention protrusion 111 should the magnetic head lifting lever 94 be at its initial position. When the retention pawl 88 is protruded into the through-hole 112 and the magnetic head lifting lever 94 is moved rearwards, the retention pawl 88 is retained by the retention protrusion 111, as shown in FIG. 14, so that extrication from the through-hole 112 and upward movement of the retention pawl 88 is inhibited. That is, when the magnetic head lifting lever 94 is slid rearwards after rotation towards the base member 2, the retention pawl 88 is retained by the retention protrusion 111 for inhibiting the separating movement from the base member 2.

Constitution for Supporting the Base Member

The base member 2 is supported in a floating fashion relative to the frame 1, as mentioned hereinabove. That is, the base member 2 is supported by a damper unit 14 by each of four support pieces 190 to 193 projected towards the inner side of the frame 1, as shown in FIG. 22.

Figure 32:
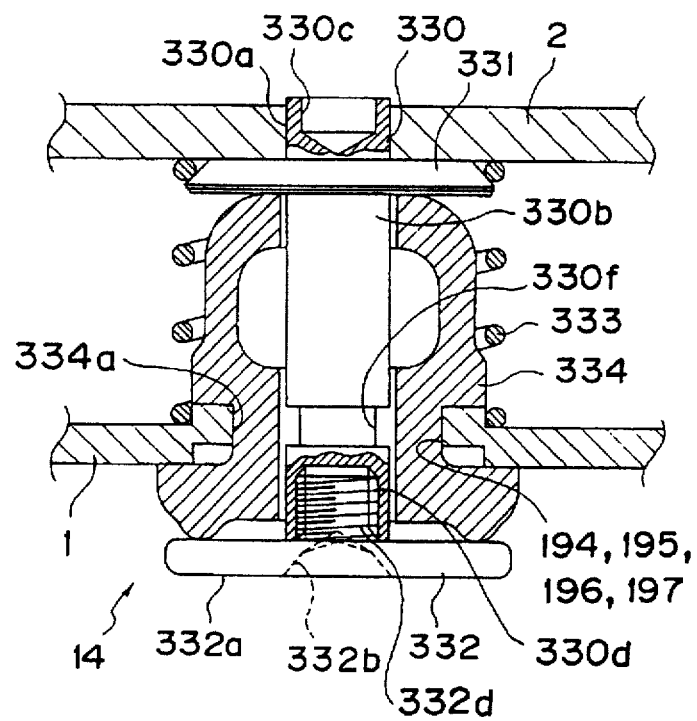
FIG. 32 is a longitudinal cross-sectional view showing a damper unit employed in the recording and/or reproducing apparatus according to the present invention.

The damper unit 14 has a shaft 330 set for depending from the lower surface of the base member 2, as shown in FIG. 32. The shaft 330 has a first flange 331 at its upper proximal end in FIG. 32 towards the base member 2, and also has a second flange 332 at its distal end shown at a lower mid portion in FIG. 32.

The shaft 330 has its proximal end portion as a mounting portion 330a for mounting on the base member 2. The mounting portion 330a has a caulking recess 330c formed axially from its proximal end. The mounting portion 330a is introduced into a mounting opening in the base member 2 and subsequently mounted on the base member 2 by a caulking consisting in deforming the periphery of the caulking recess 330c outwards. When the mounting portion 330a is mounted on the base member 2, the first flange 331 is caused to bear against the base member 2. The portion of the shaft 330 beyond the first flange 331 is a columnar-shaped pivot 330b. The distal end of the pivot 330b is formed with a female thread 330d along its axis.

A second flange 332a is formed as a head of a set screw 332 having a center threaded portion 332d and is mounted on the distal end of the pivot 330b by the threaded portion 332d being engaged with the threads 330d of the shaft 330. A cross-shaped slot 332b engaged by a screwdriver is formed on the side of the flange 332a opposite to the side having the threaded portion.

Between the first flange 331 and a second flange 332a is interposed a damper 334 as a vibration absorbing member. The damper 334 is substantially cylindrically-shaped and formed of a viscoelastic material, such as butyl rubber. The damper has a center hole 334b passed through by the pivot 330b of the shaft 330 and has upper and lower ends abutted against the first flange 331 and the second flange 332a. The damper 334 has an engagement groove 334a encircling the damper 334 engaged by the inner periphery of supporting holes 194 to 197 bored in the supporting lugs 190 to 193 formed in the frame 1. The damper 334 absorbs vibrations transmitted from the frame 1 and prevents the vibrations from being transmitted to the base member 2. The damper unit 14 has a compression coil spring 333 which is fitted on the outer side of the damper 334 in order to function as a first elastic member interposed between the lower surface of the base member 2 and the upper surfaces of the supporting pieces 190 to 193 of the frame 1. The compression coil spring 333 thrusts the base member 2 upwards by its resiliency. The end of the compression coil spring 333 towards the base member 2 is fitted on the outer side of the first flange 331.

The pivot 330b has a reduced-diameter portion 330f in register with the frame 1 on the outer periphery for assuring the range of possible movement relative to the shaft 330 of the frame 1 in a direction perpendicular to the axis of the shaft 330 accompanying the deformation of the damper 334. The outer periphery of the first flange 331 is conically-shaped so as to be reduced in diameter towards the base member 2 in order to prevent detachment of the coil spring 333.

Figure 31:
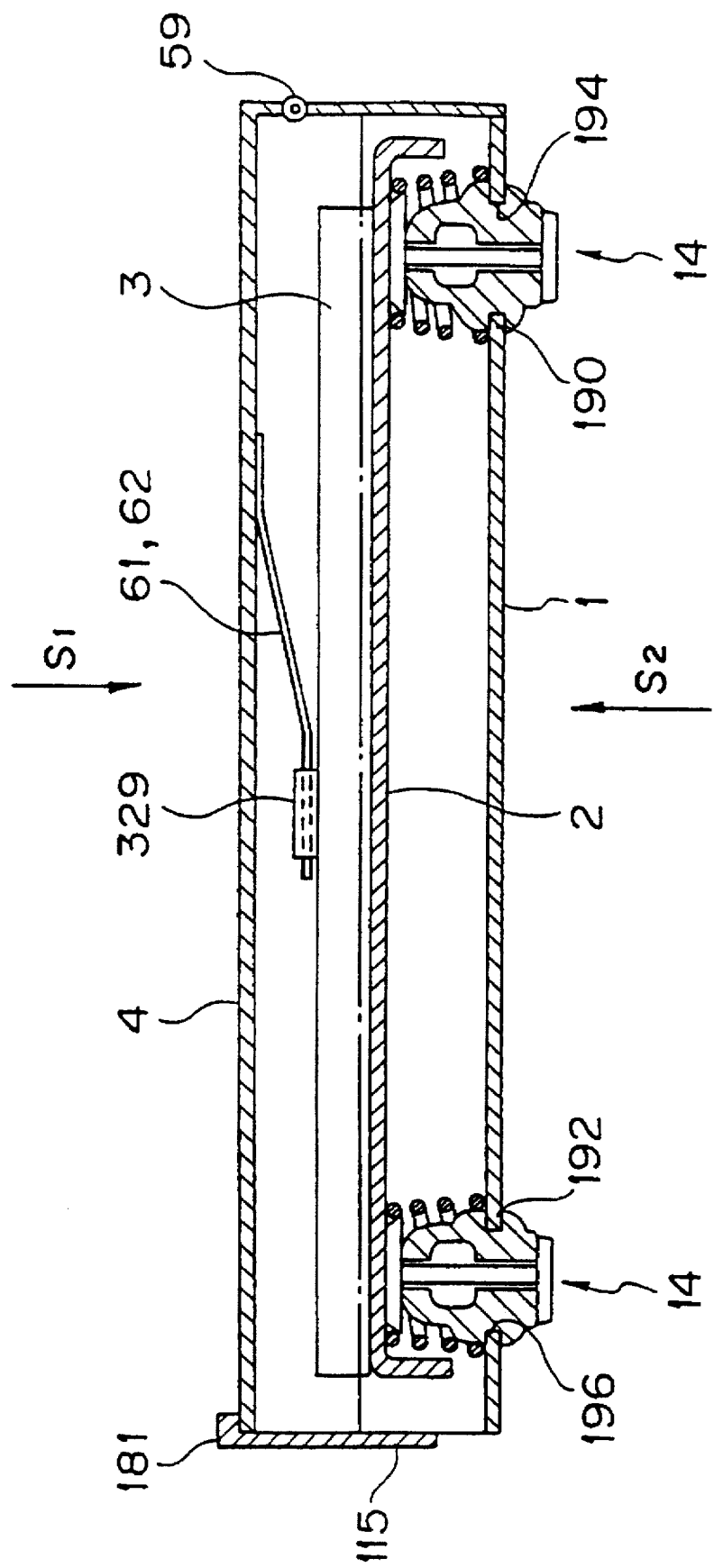
FIG. 31 is a longitudinal cross-sectional view showing a supporting structure of the mechanical chassis.

On the lower surface of the cover support plate 4 constituting the lid 700 are mounted the proximal ends of a pair of spring plates 61, 62, as second elastic members, with the distal ends directed downwards, as shown in FIG. 31. When the cover support member 4 is secured to the frame 1 in the closed state of the lid, as described subsequently, the base member 2 and the cartridge holder 3 are supported by being clamped by the four damper units 14 and the spring plates 61, 61 from the up-and-down direction indicated by arrows $S_1$, $S_2$ shown in FIG. 31. That is, the height position of the base member 2 is a counterbalanced position in which the coiling force of the compression coil spring 333 of each damper unit 14, the recoiling force of the spring plates 61, 62 and the weight of the base member 2 counterbalance one another.

Consequently, with the present disc recording and/or reproducing apparatus, it becomes possible to reduce the resonant frequency $f_0$ of the vibrating system including the base member 2 and the cartridge holder 3 and hence to achieve sufficient absorption of the vibrations by the damper units 14. In addition, the damper 334 undergoes less deformation caused by its supporting the base member 2, so that it is less susceptible to cracking and hence improved durability may be achieved. In addition, since the base member 2 and the cartridge holder 3 are supported as they are clamped between the damper units 14 and the spring plates 61, 62, it becomes possible to maintain the neutral position (the position in the stationary state) and the relative position with respect to the frame 1. Besides, since the cartridge holder 3 is thrust against the upper surface of the base member 2 by the spring plates 61, 62, it becomes possible to thrust and support the disc cartridges 220, 221 satisfactorily with respect to the base member 2. The thrusting force of the disc cartridge 220 or 221 may be on the order of 200 gf.

The foremost parts of the spring plates 61, 62 may be fitted with vibration absorbing members of, for example, rubber, interposed between the spring plates 61, 62 and the upper surface of the cartridge holder 3.

The inner side of the outer cover 5 is formed with an abutting piece 198, as shown in FIG. 23. When the outer cover 5 is mounted on the frame 1, the abutment piece 198 is intruded into the inside of the frame 1. The abutment piece 198 is positioned above the base member 2 for restricting the range of upward movement of the base member 2. Consequently, when lid 700 is rotated upwards for opening the upper surface of the main body of the apparatus, the base member 2 is biased upwards under the bias of the compression coil spring 333 of each of the damper units 14, and is positioned by being caused to bear at its lateral edge portions against the abutment piece 198.

Modification of Damper Unit employed in Disc Recording/Reproducing Apparatus

Figure 42:
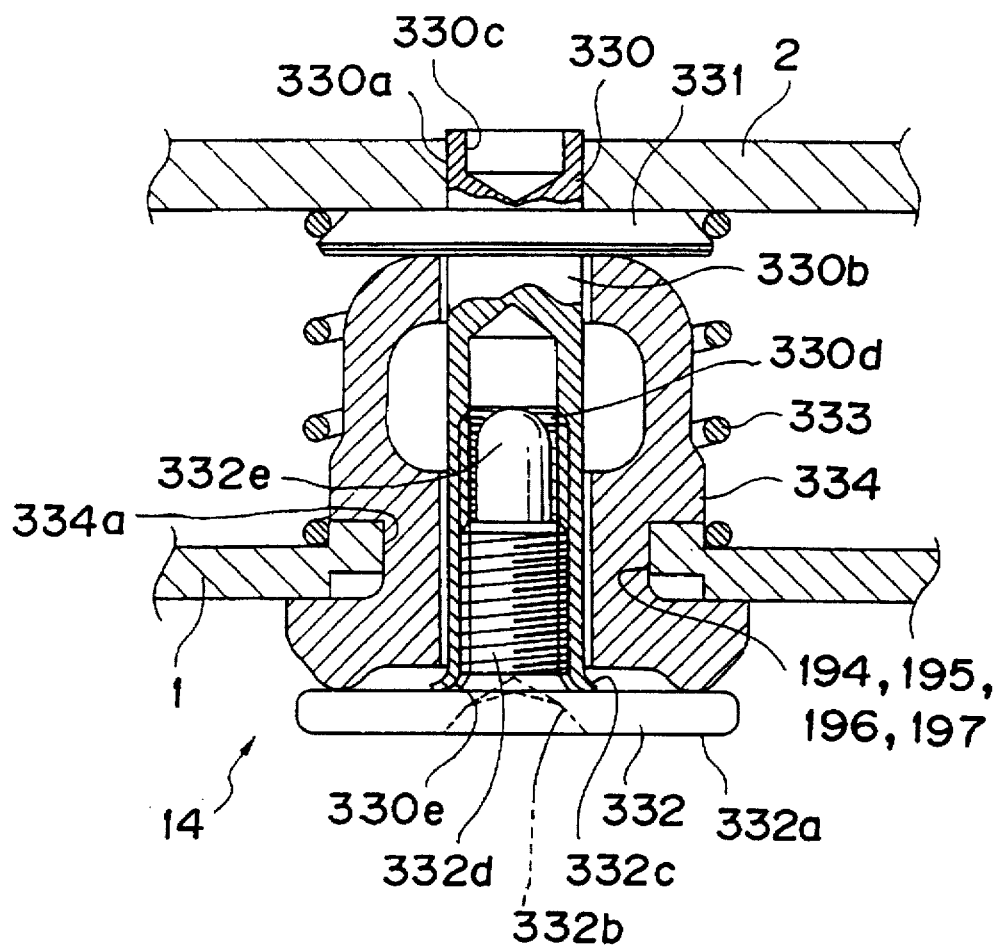
FIG. 42 is a longitudinal cross-sectional view showing a damper unit employed in the recording and/or reproducing apparatus according to the present invention.

FIG. 42 shows a modification of the damper unit 14 adapted for supporting the base member 2 by the frame 1 in a floating manner.

Referring to FIG. 42, the damper unit 14 has a shaft 330 set in a depending fashion on the lower surface of the base member 2. The shaft 330 has a first flange 331 on the proximal portion disposed at an upper side in FIG. 42 and a second flange 332a on the lower distal end in FIG. 42.

Figure 45:
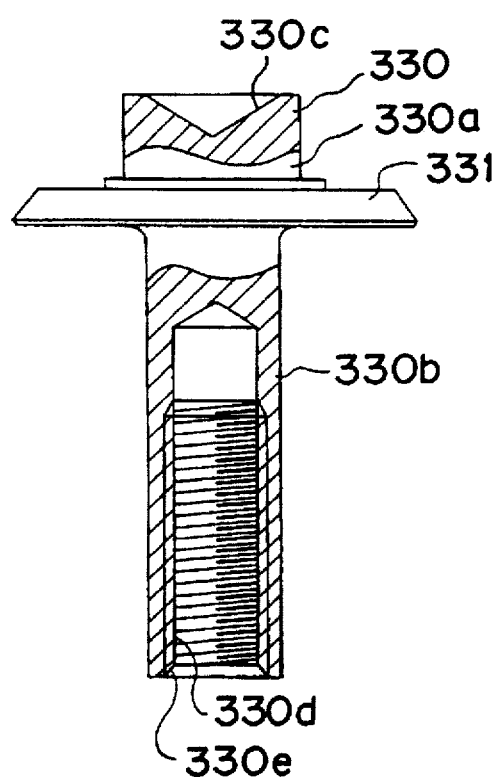
FIG. 45 is a side view showing a shaft constituting the damper unit shown in FIG. 43, with a portion thereof being broken away.

The shaft 330 has its proximal end portion as a mounting portion 330a for mounting on the base member 2, as shown in FIGS. 42 and 45. The mounting portion 330a has a caulking recess 330c formed axially from its proximal end. The mounting portion 330a is introduced into a mounting opening in the base member 2 and subsequently mounted on the base member 2 by a caulking consisting in deforming the periphery of the caulking recess 330c outwards. When the mounting portion 330a is mounted on the base member 2, the first flange 331 is caused to bear against the base member 2. The portion of the shaft 330 beyond the first flange 331 is a columnar-shaped pivot 330b. The distal end of the pivot 330b is formed with a female thread 330d along its axis. The opening edge portion of the female thread 330d is chamfered to form a a tapered portion 330e.

Figure 43:
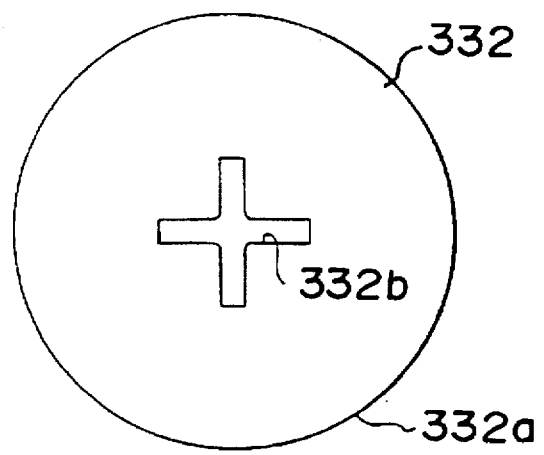
FIG. 43 is a plan view showing a set screw constituting the damper unit.
Figure 44:
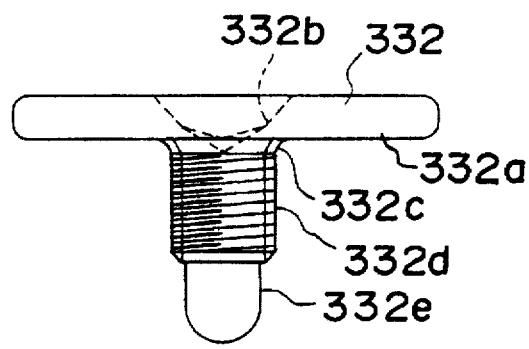
FIG. 44 is a side view showing the set screw shown in FIG. 43.

The second flange 332a is formed as a head of a set screw 332 having a center threaded portion 332d and is mounted on the distal end of the pivot 330b by the threaded portion 332d being engaged with the threads 330d of the shaft 330, as shown in FIGS. 42 to 44. A cross-shaped slot 332b engaged by a screwdriver is formed on the side of the flange 332a opposite to the side having the threaded portion 332d.

The proximal end portion of the threaded portion 332d contiguous to the second flange 332a is not formed with a screw thread but is formed as a substantially conically-shaped enlarged diameter portion 332c which is enlarged in diameter at the second flange 332a. The surface shape of the enlarged diameter portion 332c is tapered in which the cross-sectional shape of the threaded portion 332d along its axis is linear or has an arcuate cross-section, as shown in FIG. 44.

The distal end of the threaded portion 332d is coaxially formed with a cylindrically-shaped guide portion 332e which is lesser in diameter than the valley of the threaded portion 332d. The guide portion 332e has a substantially spherically-shaped foremost portion.

Between the first flange 331 and the second flange 332a is interposed a damper 334 as a vibration absorbing member. The damper 334, formed of a visco-elastic material, such as butyl rubber, is substantially cylindrical in shape, and has a central bore passed through by the pivot 330b, while having its upper and lower ends abutted against the first and second flanges 331 and 332a, respectively. The damper 334 is held between the first flange 331 and the second flange 332a by being fitted over the outer side of the pivot 330b of the shaft 330 and subsequently by screwing the set screw 332 on the shaft 330. The damper 334 has an engagement groove on its outer periphery surrounding the damper 334. This engagement groove is engaged by the inner peripheral edge of supporting openings 194 to 197 bored in the supporting pieces 190 to 193, respectively. The function of the damper 334 is to absorb vibrations transmitted via the frame 1 to prevent the vibrations from being transmitted to the base member 2.

The damper unit 14 has a compression coil spring 333 as a first elastic member fitted over the outer side of the damper 334 and interposed between the lower surface of the base member 2 and the upper surfaces of the supporting pieces 190 to 193 of the frame 1. The compression coil spring 333 thrusts and supports the base member 2 upwards under its resiliency. The end of the compression coil spring 333 towards the base member 2 is fitted over the outer side of the first flange 331.

When the set screw 332 is mounted on the shaft 330, its enlarged diameter portion 332c is intruded into the tapered portion 330e, and the threaded portion 332d is screwed in the female thread 330d of the shaft 330 with a pre-set torque until the second flange 332a is caused to bear against the distal end of the pivot 330b of the shaft 330. The enlarged diameter portion 332c thrusts the tapered portion 330e outwards at this time for deforming the distal end of the pivot 330b outwards. Such deformation of the distal end of the pivot 330b is effective to hold the enlarged diameter portion 332c for preventing the enlarged diameter portion from being extracted from the shaft 330.

For screwing the set screw 332 on the shaft 330, the guide portion 332e is first intruded into the female thread 330d. The guide portion 332e is lesser in diameter than the female thread 330d, and has a spherically-shaped distal end, so that it can be easily fitted into the female thread 330d. By rotating the set screw 332 after the guide portion 332e is introduced into the female thread 330d, the center threaded portion 332d can be easily threaded with the female thread 330d.

The outer periphery of the first flange 331 is conically-shaped, with a diminishing diameter towards the base member 2, for preventing detachment of the compression coil spring 333.

Constitution of the Lid

The lid 700 of the recording and/or reproducing apparatus according to the present invention is made up of the cover support plate 4 and the upper cover 7, as shown in FIG. 9. The cover support plate 4 is formed as a metal sheet material and is made up of a main plate portion and an attachment plate portion 58 rotatably mounted on the rear edge of the main plate portion via a pivot 59. The attachment plate portion 58 is screwed to the rear surface of the battery casing 8 by so-called co-tightening along with the lower cover 6. The cover support plate 4 is supported above the base member 2 for covering the upper surface of the cartridge holder 3. The cover support plate 4 is rotatable in a direction towards and away from the upper surface of the cartridge holder 3. The upper cover 7 is mounted on the upper surface of the cover support plate 4 for covering the cover support plate 4.

A link mounting plate 53 is mounted depending from a lateral surface of the cover support plate 4, as shown in FIG. 9. A second click stop link 45 has its rear edge portion rotatably mounted via a pivot 46 on the link mounting plate 53. The second link stop link 45 has its forward end portion engaged in an engagement opening 51 of a click stop piece 50 mounted upright on the upper edge of the flange 1. The engagement opening 51 is oblong with its long axis along the fore-and-aft direction and carries the forward end of the second click stop link 45 in such a manner as to allow for longitudinal movement and rotation of the second click stop link 45. A click stop lug 49 is formed near the forward end of the second click stop link 45. The click stop piece 50 has a click stop opening 52 ahead of the engagement opening 51. When the lid 700 closes the upper end portion of the base member 2, the click stop lug 49 is positioned ahead of the click stop opening 52, as shown in FIG. 9. When the lid 700 is rotated in the direction shown at B in FIG. 9, the forward end portion of the second click stop link 45 is moved rearwards along the engagement opening 51, at the same time as it is rotated about the pivot 48, as shown in FIG. 9, for engaging the click stop lug 49 with the click stop opening 52. The lid 700 is held at this time in an open position shown in FIG. 12.

Figure 25:
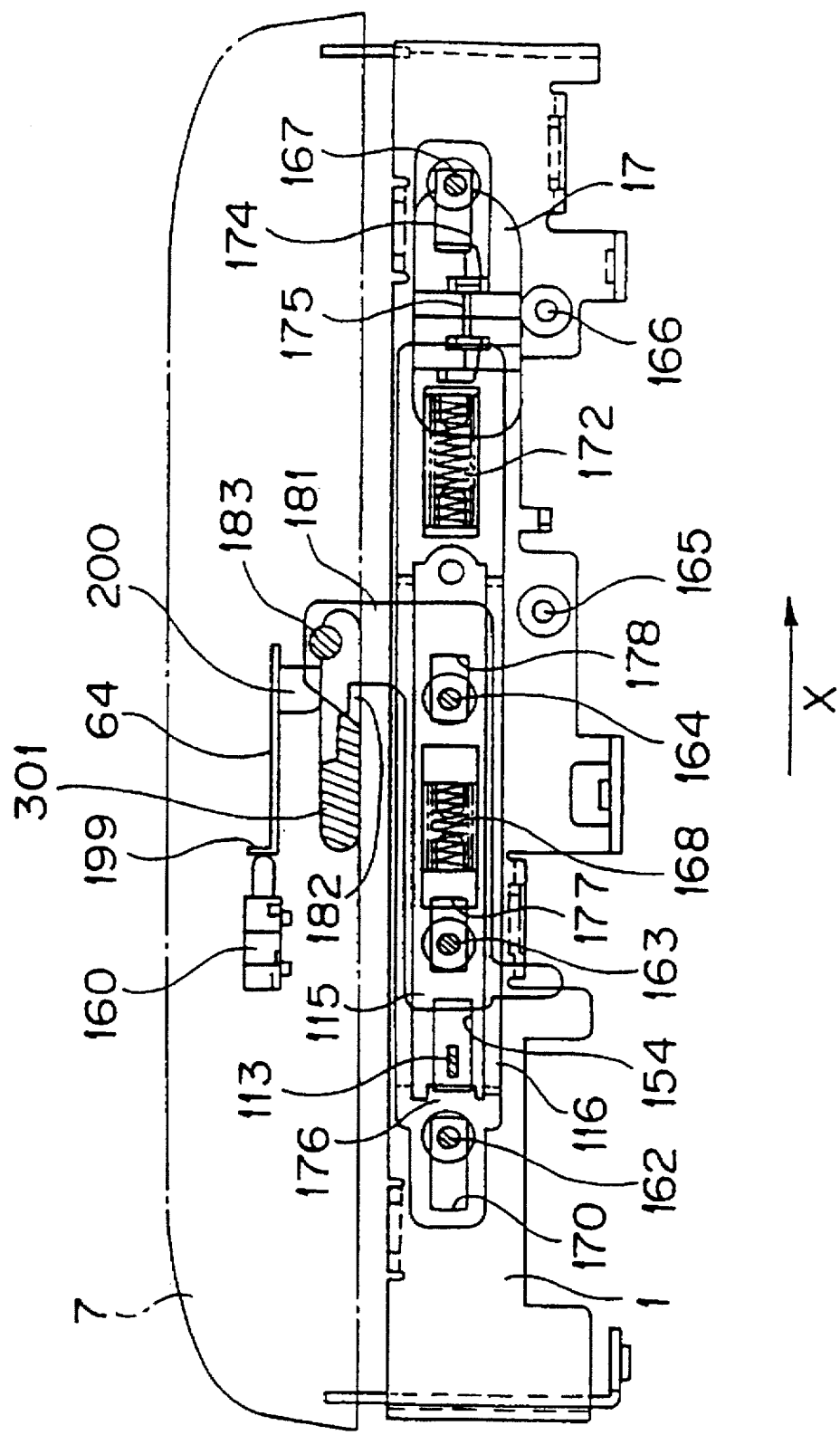
FIG. 25 is a front view showing the state of an upper being closed.
Figure 26:
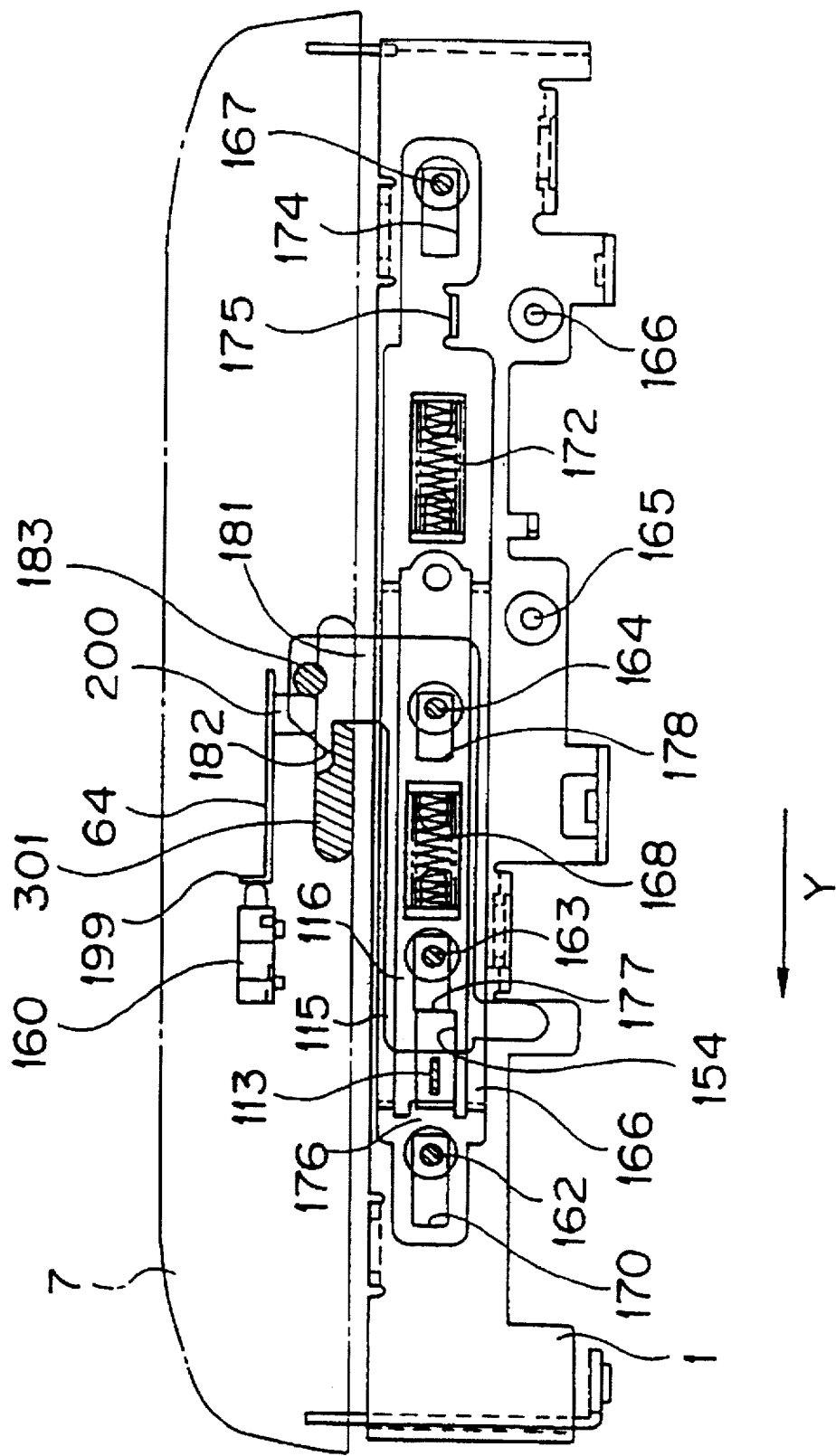
FIG. 26 is a front view showing the state of the upper lid which has been closed.
Figure 27:
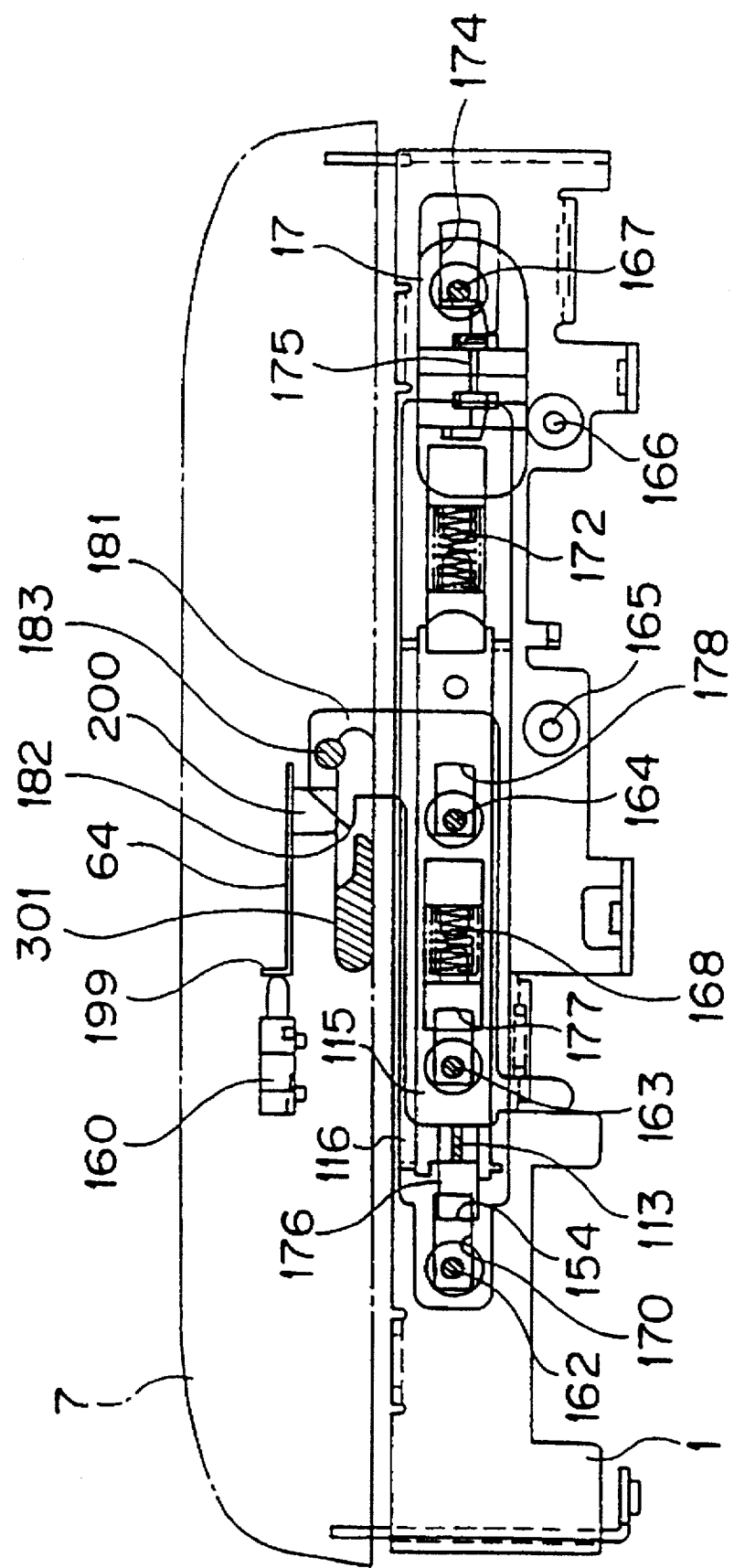
FIG. 27 is a front view showing the state in which retention of the upper cover has been released.

A retention member 301 is projectedly mounted on the inner side near the forward edge of the upper cover 7, as shown in FIGS. 25 to 27. The retention member 301 is retained by a lock lever 115 mounted on the front surface of the main frame 1 for maintaining the lid 700 in the state of having closed the upper surface of the main body of the apparatus., as shown in FIG. 25.

The lock lever 115 has longitudinal support slits 177, 178, in which supporting pins 163, 164 implanted on the front surface of the frame 1 are introduced so that the lock lever 115 is slidable in a sideways direction relative to the frame 1, as shown in FIG. 25. The upper end of the lock piece 181 is hook-shaped, that is it has its end bent towards the opposite side, and has a downwardly directed retention portion 182. When the lid 700 is at the position of closing the main body of the apparatus, the lock lever 115 engages the retention portion 182 with the upper edge of the retention member 301 for suppressing the opening of the lid 700, as shown in FIG. 26. The lock lever 115 has a spring mounting opening 179 between supporting slits 177 and 178. The lock lever 115 is biased by a compression coil spring 168 mounted within the spring mounting opening 179 in a direction indicated by arrow $T_1$ shown in FIG. 20 and is positioned at a position capable of retaining the retention member 301. The compression coil spring 168 has its one end engaged in a spring engagement piece 180 at an edge of the spring mounting opening 179, while having its other end engaged with a spring retention piece 157 at an edge of the spring mounting opening 256 formed in the front surface of the frame 1.

The lock piece 181 has the opposite side portion of its upper end tapered so as to be inclined upwards and, when the lid 700 is at a position of closing the upper surface of the main body of the apparatus, as shown in FIG. 25, the lock piece 181 has its tapered portion thrust by the retention member 301 for shifting the lock lever 115 in a direction shown by arrow X in FIG. 25. When the lid 700 closes the upper surface of the main body of the apparatus, the lock piece 181 is raised in its position to above the retention member 301, so that the lock piece 181 is returned to the initial position indicated by arrow Y in FIG. 26, under the bias of the compression coil spring 168, thereby retaining the retention member 301.

An ejection lever 116 has supporting slits 170, 174 extending in the longitudinal direction and is supported for sliding laterally of the frame 1 by supporting pins 162, 167 set on the front surface of the frame 1 passed through these supporting slits 170, 174. The ejection lever 116 has an opening 171 at a mid portion in register with the lock lever 115 so as not to be abutted against the lock lever 115. The opposite side edge of the opening 171 has an abutment portion 176 facing the opposite end of the lock lever 115. The ejection lever 116 has a spring mounting opening 172 between the opening 171 and the supporting slit 174. The ejection lever is biased by a compression coil spring 169 mounted in the spring mounting opening 172 in a direction indicated by arrow $T_1$ and is positioned at a location capable of forming a gap between the abutment portion 176 and the opposite end of the lock lever 115. The compression coil spring 169 has its one end engaged with a spring engagement piece 173 at an edge of the spring mounting opening 172 and its other end engaged with a spring engagement piece 160 at an edge of a spring mounting opening 159 formed in the front surface of the frame 1.

A detection pin 183 is mounted upright on the rear surface of the foremost part of the lock piece 181, as shown in FIG. 25. A transmission arm 64 and a lid lock detection switch 60 are mounted near the forward edge of the upper surface of the cover support plate 4. The lid lock detection switch 60 has a pusher mounted on its one end. The transmission arm 64 has a thrust portion 200 on its one end located above the retention member 301 and has a thrusting portion 199 at its other end facing the pusher of the lid lock detection switch 160. When the lock piece 181 retains the retention member 301, the detection pin 183 thrusts the thrust portion 200 of the transmission arm 64, which thrusts the pusher of the lid lock detection switch 160 by the thrusting portion 199. When the lid 700 is not fully closing the upper surface of the main body of the apparatus, as shown in FIG. 25, or when the lid 700 is positioned at the closure position but the lock lever 115 is slid against the bias of the compression coil spring 168, as shown in FIG. 27, the lid lock detection switch 160 is not actuated. That is, the closure of the lid 700 and retention of the retention member 301 by the lock lever 115 may be detected by detecting the thrust state of the lid lock detection switch 160. The lid lock detection switch 160 is electrically connected as a switch B as shown in FIG. 36.

An ejection transmission member 95 is mounted on the forward end of the magnetic head lifting lever 94, as shown in FIGS. 15 to 17. The ejection transmission member 95 has forward and rear mounting openings 103, 102 and is mounted on the magnetic head lifting lever 94 by these mounting openings 103, 102 being passed through by forward and rear supporting pins 101, 100 set upright on the magnetic head lifting lever 94. The forward mounting opening 103 is larger in diameter than the forward supporting pin 101 insofar as the fore-and-aft direction and the transverse direction are concerned. The rear mounting opening 102 is an oblong hole having the fore-and-aft direction as the longitudinal direction, and substantially corresponds in diameter to the rear supporting pin 100 insofar as the transverse direction is concerned. That is, the ejection transmission member 95 is rotatable with respect to the magnetic head lifting lever 94 about the rear end as the center of rotation, as indicated by arrow in FIG. 15, while being slidable in the fore-and-aft direction as indicated by arrow V in FIG. 15. The ejection transmission member 95 is positioned at an initial position by a tension coil spring 105 mounted between a spring retainer 106 set upright on its forward side and a spring retainer 194 set upright on a forward side of the magnetic head lifting lever 94. The initial position of the ejection transmission member 95 is such position in which it is moved forwards relative to the magnetic head lifting lever 94 and it has its forward end rotated towards the opposite lateral side, that is in a direction opposite to arrow U in FIG. 15.

An ejection transmission piece 113 is set upright on the forward end of the ejection transmission member 95. When the magnetic head lifting lever 94 is slid towards the forward side and the magnetic head 13 is thereby held at its upper position, the ejection transmission piece 113 is protruded beyond the front surface of the frame 1 via a through-hole formed in the forward edge of the base member 2 and a through-hole 154 formed in the front surface of the frame 1. At this time, the ejection transmission piece 113 is intruded between the opposite end of the lock lever 115 and the abutment portion 176 of the ejection lever 116, as shown in FIG. 15. If at this time the ejection knob 17 is actuated and the ejection lever 116 is slid towards a lateral side against the bias of the compression coil spring 169 in a direction indicated by arrow C in FIG. 15, the ejection transmission piece 113 is rotated in a direction indicated by arrow U in FIG. 15, at the same time as the lock lever 115 is slid towards the above-mentioned lateral side as indicated by arrow C in FIG. 15 for releasing the retention of the lock lever 115 with respect to the retention member 301.

When the magnetic head lifting lever 94 is slid rearwards as shown in FIGS. 16 and 17, the ejection transmission piece 113 is receded rearwards via a space between the opposite end of the lock lever 115 and the abutment portion 176 of the ejection lever 116. In such case, when the ejection knob 17 is actuated and the ejection lever 116 is slid towards the above-mentioned lateral side, the abutment portion 176 is not abutted against the ejection transmission piece 113, so that the ejection transmission piece 113 is not rotated. Thus the lock lever 115 is not slid and hence its retention with respect to the retention member 301 is not released.

In the playback mode, the magnetic head lifting lever 94 is at a first position in which the ejection transmission piece 113 is receded from a space between the lock lever 115 and the abutment portion 176 but in which the magnetic head 13 is maintained at its upper position, as shown in FIG. 16. In the recording mode, the magnetic head lifting lever 94 is at a second position in which the ejection transmission piece 113 is receded form the space between the lock lever 115 and the abutment portion 176 and in which the magnetic head 13 is rotated downwards, as shown in FIG. 17.

If, while the magnetic head lifting lever 94 is moved towards the rear, the ejection lever 116 is slid and the magnetic head lifting lever 94 is moved forwards in this state, the ejection transmission piece 113 is caused to bear on the ejection lever 116. In this case, the ejection transmission member 95 is maintained in a position in which, even if the magnetic head lifting lever 94 is shifted forwards, the ejection transmission piece 113 is caused to bear on the ejection lever 116 under deflection of the tension coil spring 105. When the ejection lever 116 is returned to its initial position, the ejection transmission member 95 causes the ejection transmission piece 113 to be intruded into a space between the opposite end of the lock lever 115 and the abutment portion 176 of the ejection lever 116 for returning the magnetic head lifting lever 94 to its initial position.

Figure 10:
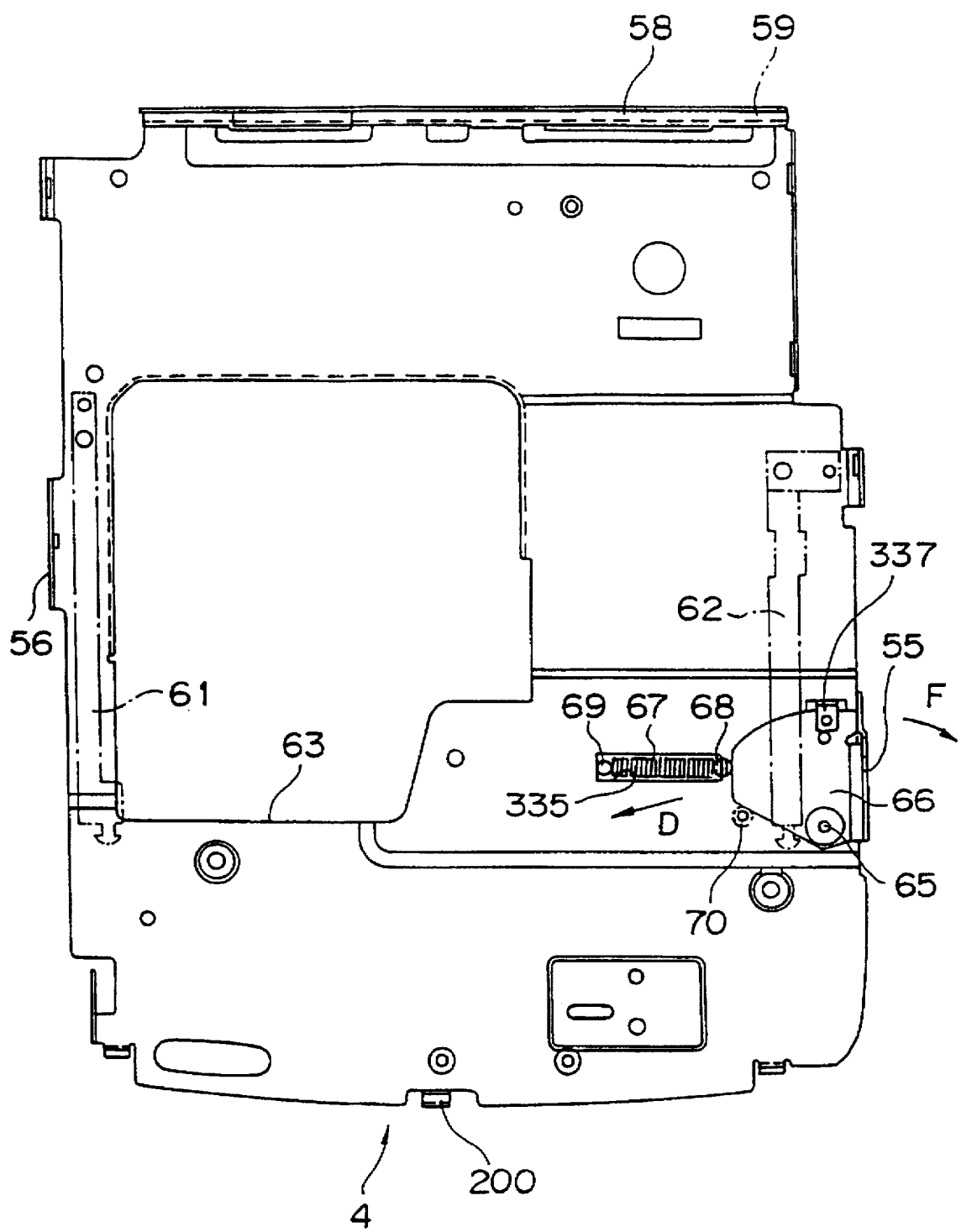
FIG. 10 is a bottom view showing a cover support plate constituting the recording and/or reproducing apparatus according to the present invention.
Figure 11:
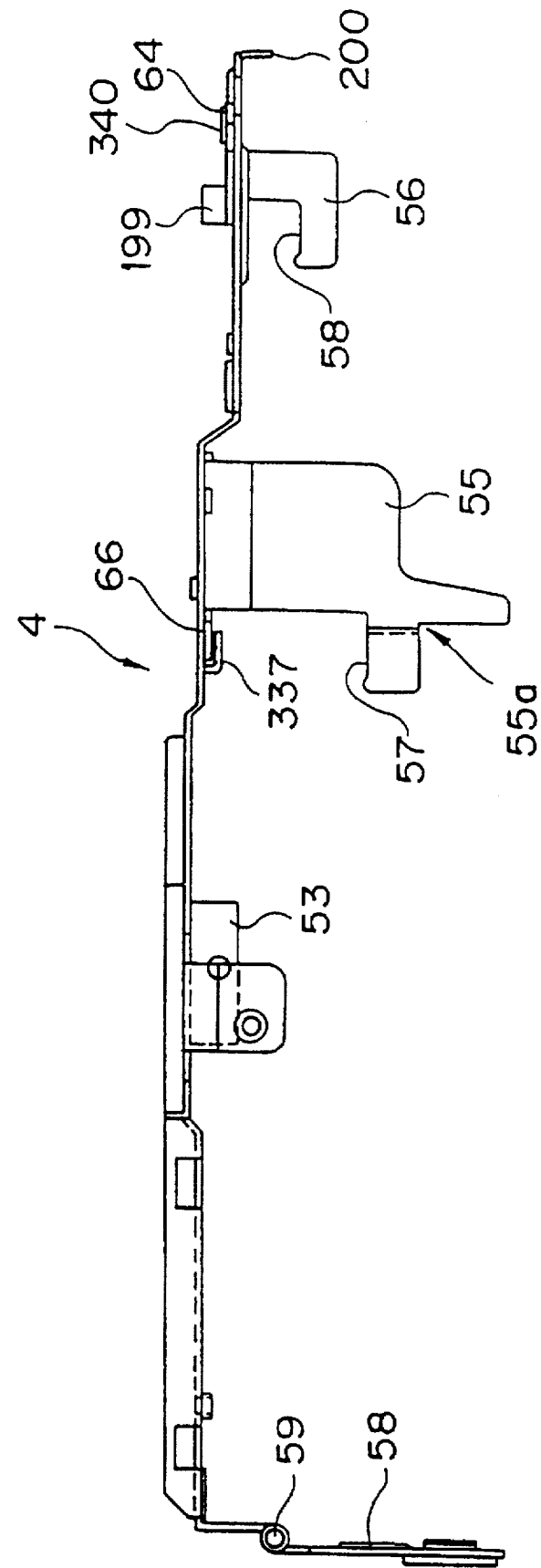
FIG. 11 is a left-hand side view of the cover support plate shown in FIG. 10.

On both lateral side edges of the cover support plate 4, there are formed cartridge suspending engagement pieces 55, 56 that extend downwardly, as shown in FIG. 11. The cartridge suspension engagement piece 56 is formed as one with the cover support plate 4 and is hook-shaped so as to be bent rearwards. The upper edge of the hook-shaped bend of the engagement piece 56 for cartridge suspension is designed as a suspension portion 58. The cartridge suspending engagement piece 55 has its proximal portion 66 mounted rotatably on the cover support plate 4, while having its distal end 55a bent rearwards in the form of a hook, as shown in FIG. 10. The upper edge of the hook-shaped bend of the engagement piece 55 for cartridge suspension is designed as a suspension portion 57. The suspension portions 57, 58 of these suspension engagement pieces 55, 56 are engaged with engagement portions 118, 120 protuberantly mounted on both lateral sides of the cartridge holder 3. When the lid 700 has closed the upper surface of the main body of the apparatus, these suspension engagement pieces 55, 56 suspend the cartridge holder 3 and rotate it to above the base member 2, as shown in FIG. 12. The cartridge holder 3 is spaced apart at this time from the upper surface of the base member 2 and has its forward portion facing forwards at a position below the forward edge of the upper cover 7. The cover support plate 4 and the cartridge holder 3 are maintained at their rotated positions by the click stop links 24, 45.

Figure 33:
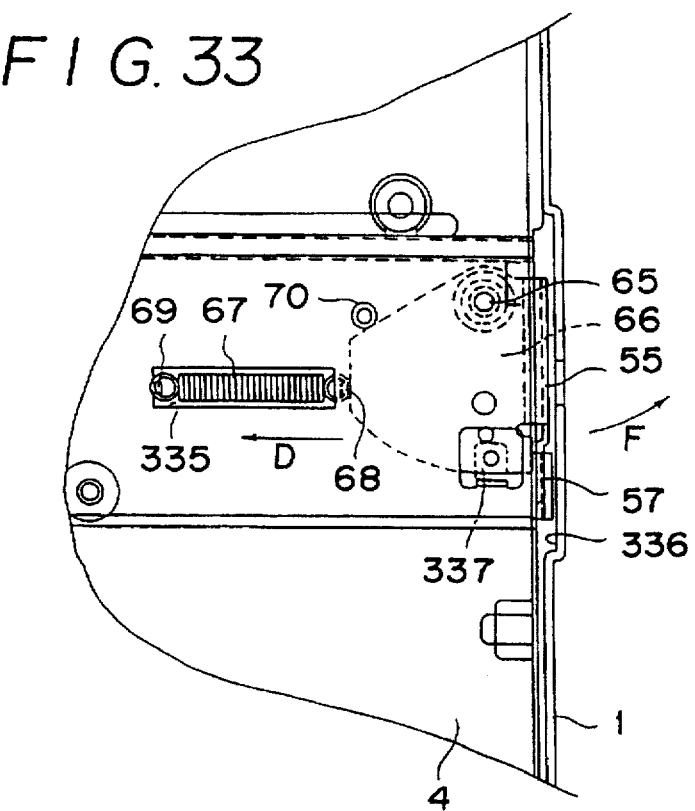
FIG. 33 is a schematic enlarged plan view showing a member for suspending a cartridge holder.

The suspension engagement piece 55 has its proximal portion 66 bent to follow the lower surface of the cover support plate 4, and has the proximal portion 66 mounted rotatably on the cover support plate 4 via a pivot 65, as shown in FIGS. 10 and 33 to 35. The pivot 65 is perpendicular to the major surface of the cover support plate 4 and is located at the forward edge of the suspension engagement piece 55. Thus the suspension engagement piece 55 is rotatable so that its rear edge shown by arrow F in FIGS. 10 and 33 is moved outwards. The suspension engagement piece 55 is rotationally biased in a direction indicated by arrow D in FIG. 33 by a tension coil spring 67 mounted between a spring retainer 68 provided on the proximal portion 66 of the suspension engagement piece 55 extending along the cover support plate 4 and a spring retainer 69 mounted on the cover support plate 4. The suspension engagement piece 55 is positioned at its initial position by the proximal portion 66 abutted against an abutment 70 provided on the cover support plate 4. The proximal portion 66 of the suspension engagement piece 55 is sector-shaped about the pivot 65 and has its rear edge slidably supported by a support piece 337.

When the damper unit 14 is elastically deformed under vibrations or impacts applied to the main body of the apparatus, the base member 2 and the cartridge holder 3 are moved relative to the frame 1, and the suspension engagement piece 55 thus supported for rotation is caused to bear against the cartridge holder 3 and thereby elastically rotates outwards. Thus the cartridge holder 3 is permitted to be moved under vibrations even if the suspension engagement piece 55 approaches to or is contacted with the cartridge holder 3. The opposite side of the frame 1 has a bend 336 which is extended outwards for procuring the range of rotation of the suspension engagement piece 55.

Since the suspension engagement piece 55 in the present disc recording and/or reproducing apparatus is rotatable, the apparatus may be diminished in size while maintaining a sufficient range of movement for shock absorption by elastic deformation of the damper unit 14 for the cartridge holder 3 and the base member 2. That is, if it is desired to procure a range of possible movement of the cartridge holder 3 equal to 0.8 mm, and if the suspension engagement piece 55 is secured to the cover support plate 4, it is necessary to provide a gap of 0.8 mm between the lateral surface of the cartridge holder 3 and the suspension engagement piece 55, while it is also necessary to provide a gap of 0.8 mm between the distal end of the engagement portion 118 engaged with the suspension engagement piece 55 and the inner wall of the upper cover 7, so that it becomes necessary to provide a gap equal to at least 1.6 mm plus the thickness of the suspension engagement piece 55 between the lateral surface of the cartridge holder 3 and the inner wall of the upper cover 7. With the present disc recording and/or reproducing apparatus, if it is desired to procure the range of possible movement of 0.8 mm for the cartridge holder 3, since the suspension engagement piece 55 is movable relative to the cover support plate 4, a gap of 0.8 mm is required between the distal end of the engagement portion 118 engaged with the suspension engagement piece 55 and the inner wall of the cover support plate 7, as shown in FIG. 34. However, there is required substantially no gap between the lateral surface of the cartridge holder 3 and the inner wall of the cover support plate 7, such that a distance substantially equal to 0.8 mm plus the thickness of the suspension engagement piece 55 between the lateral surface of the cartridge holder 3 and the inner wall of the cover support plate 7 suffices. However, in the present disc recording and/or reproducing apparatus, since the range of possible movement of the cartridge holder 3 is 0.8 mm, and a gap on the order of 0.4 mm is provided between the lateral surface of the cartridge holder 3 and the suspension engagement piece 55, a distance between the lateral surface of the cartridge holder 3 and the inner wall of the cover support plate 7 equal to substantially 0.8 mm plus the thickness of the suspension engagement piece 55 suffices.

Although the suspension engagement pieces 55 and 56 are rotatable relative to the cover support plate 4 only on one side, the same constitution may be used on both sides so that each of the suspension engagement pieces 55 and 56 may be rotatable relative to the cover support plate 4.

State in the Stop Mode

If the above-described present disc recording and/or reproducing apparatus according to the present invention is in the stop mode, and none of the disc cartridges 220 or 221 is loaded, the magnetic head lifting lever 94 is at the forward initial position as shown in FIG. 15. If the ejection knob 17 is actuated at this time, the lock lever 115 is slid so that retention of the lock piece 181 by the retention member 301 for the lid 700 is released.

Since the cartridge loading detection switch 72 is not thrust, the disc driving unit 339 is not driven by the CPU 338 even if the key input section 15 is actuated.

Figure 37:
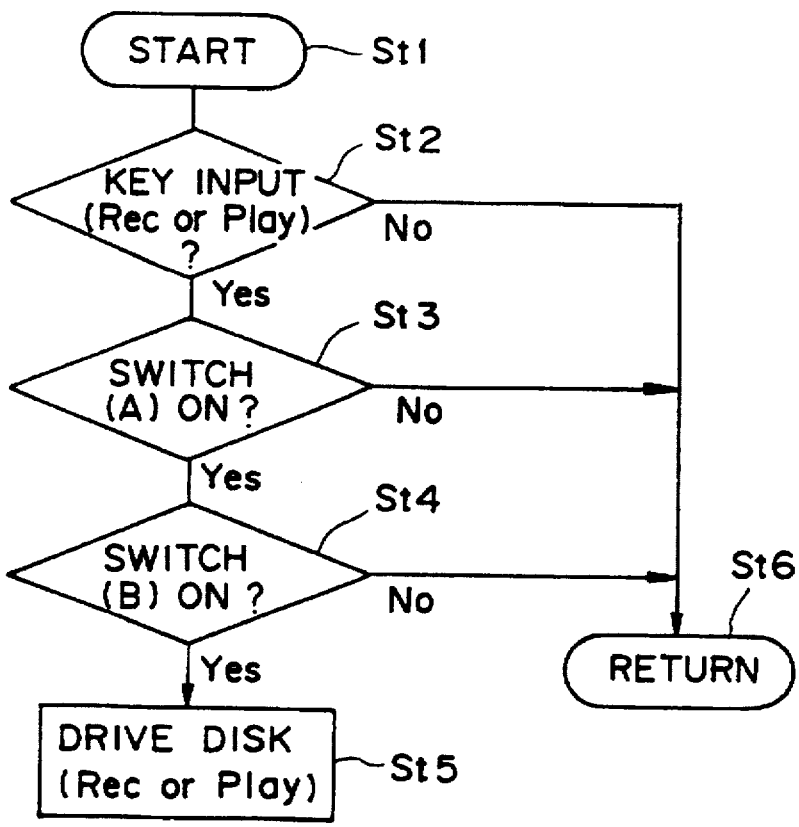
FIG. 37 is a flow chart showing an operating procedure of the recording and/or reproducing apparatus according to the present invention.

Referring to the flow chart of FIG. 37, if the flow chart is started on power up at a step st1, the CPU 338 decides at a step st2 whether or not an input has been made on the key input unit 15. If there is no input at the key input unit 15, processing transfers to a step st6 for returning. At the step st3, it is checked whether or not the cartridge loading detection switch (switch A) 72 has been actuated. If the cartridge loading detection switch 72 has been actuated, processing transfers to a step st4 and, if the cartridge loading detection switch 72 has not been actuated, processing transfers to the step st6 for returning. At the step st4, it is checked whether or not the lid lock detection switch (switch B) 160 has been actuated. If the lid lock detection switch 160 has been actuated, processing traverses to a step st5 and, if otherwise, processing traverses to the step st6 for returning. At the step st5, the CPU 338 is responsive to actuation at the key input unit 15 for driving controlling the disc driving unit 339.

Loading of Disc Cartridge

For loading the disc cartridges 220 or 221 on the present disc recording and/or reproducing apparatus, the ejection knob 17 is actuated as described above, after which the lid 700 is rotated upwards to a position above the main body of the apparatus, as shown in FIG. 12. The disc cartridge 220 or 221 is introduced into the cartridge holder 3 from the front side. If any one of the disc cartridges 220 or 221 is introduced into the cartridge holder 3, the shutter member 206, 217 mounted on the cartridge main body 205 or 216 is moved for opening the apertures 222, 223 formed in the cartridge main body 205 or 216. If the lid 700 is rotated downwards for closing the main body of the apparatus, the disc cartridge 220 or 221 is loaded in position on the base member 2, as shown in FIG. 13. The cartridge loading detection switch 72 is thrust at this time by the loaded disc cartridges 220 or 221 for detecting that one of the disc cartridges 220 or 221 has been loaded. By the lid 700 being retained by the lock lever 115, the lid lock detection switch 160 is thrust for detecting that the main body of the apparatus has been closed by the lid 700. If in this state there is any input on the key input unit 15, the CPU 339 is enabled to control the driving of the disc driving unit 339.

State in the Playback Mode

If, after any of the disc cartridges 220 or 221 is loaded, and the lid lock detection switch 160 has detected that the main body of the apparatus has been closed by the lid 700, a command signal of starting the playback mode is entered at the key input unit 15, the CPU 338 runs the stepping motor 85 in rotation and shifts the magnetic head lifting lever 94 rearwards as indicated by arrow Z in FIG. 16 for positioning the ejection transmission piece 113 back of the lock lever 115 for setting the magnetic head 13 at a first upper position, as shown in FIG. 16. If in this state the magneto-optical disc 200 or the optical disc 201 is rotated by the spindle motor 89, and the optical pickup 10 is moved radially of the magneto-optical disc 200 or the optical disc 201, the information signals recorded on the magneto-optical disc 200 or the optical disc 201 are reproduced. If track jump buttons 30, 31 or the pause button 32 is actuated, track jump towards the inner or outer rim of the magneto-optical disc 200 or the optical disc 201 or pause is executed. If, during the playback mode operation, the ejection lever 116 is slid temporarily, the ejection transmission piece 113 is receded so that the lock lever 115 is not slid and hence retention of the lid 700 is not released. If a stop button 29 is actuated for setting the stop mode, the magnetic head lifting lever 94 is reset to the forward initial position for enabling unlocking of the lid 700 by the lock lever 116 by the operation of the ejection lever 116.

State during Recording Mode

In selecting the recording mode of recording information signals, the recording/playback disc cartridge 220 is loaded. If, after the disc cartridge 220 has been loaded, and the lid lock detection switch 160 has detected that the main body of the apparatus has been closed by the lid 700, a command signal for starting the recording mode is entered at the key input unit 15, the CPU 338 runs the stepping motor 338 in rotation for shifting the magnetic head lifting lever 94 rearwards as indicated by arrow Z in FIG. 17. Thus the ejection transmission piece 113 is moved to a second position in which the ejection transmission piece 113 is at back of the lock lever 115 and the magnetic head 13 is shifted to a lower position, as shown in FIG. 17.

In this state, the magneto-optical disc 200 is rotated by the spindle motor 89, and the optical pickup 10 and the magnetic head 13 are moved in unison along the radius of the magneto-optical disc 200 for recording information signals on the magneto-optical disc 200. During the recording mode, the magnetic head 13 is moved across the inner and outer rims of the magneto-optical disc 200 in a state in which it is approached to or in sliding contact with the magneto-optical disc 200. By actuating the track jump buttons 30, 31 or the pause button 32 at this time, track jump towards the inner or outer rim of the magneto-optical disc 200 or pause is executed. If, during the playback mode operation, the ejection lever 116 is slid temporarily, the ejection transmission piece 113 is receded so that the lock lever 115 is not slid and hence retention of the lid 700 is not released. If the stop button 29 is actuated for setting the stop mode, the TOC information indicating addresses as discrimination signals for the information signals which have so far been written is written. After the end of writing of the TOC information, the magnetic head lifting lever 94 is reset to its forward side initial position. By such resetting of the magnetic head lifting lever 94, and by actuation of the ejection lever 116, locking of the lid 700 by the lock lever 116 is now enabled.

If the replay-only disc cartridge 221 or the recording/playback disc cartridge 220, the writing of information signals on which has been inhibited by the actuation of the mistaken recording inhibiting mechanism 214, is loaded, the disc cartridge 220 or 221 now loaded is detected to be unrecordable by a detection output which has detected the discrimination openings 224 formed in the disc cartridges 220 or 221, even although a command for starting the recording mode is entered by the key input unit 15. Thus the recording mode is not set by the CPU 338.

Ejection of Disc Cartridge

With the present disc recording and/or reproducing apparatus, if, after the end of reproduction of information signals from the disc cartridges 220 or 221, or after the end of recording of information signals on the magneto-optical disc 200, the stop mode is set, the disc cartridges 220 or 221 loaded on the disc recording and/or reproducing apparatus is enabled to be ejected.

That is, if, during the stop mode, the ejection knob 17 is actuated for sliding the ejection lever 116 towards one lateral side, the locking of the lid 700 by the lock lever 115 is released and the lid 700 is enabled to be rotated upwardly of the main body of the apparatus. If the lid 700 is unlocked, and the lid 700 is rotated upwardly of the main body of the apparatus, the cartridge holder 3 is rotated upwards as shown in FIG. 12 to follow up with the lid 700 so as to be separated from the base member 2. The disc cartridges 220 or 221, held on the cartridge holder 3, is lifted above the base member 2, and is pushed forwardly of the cartridge holder 3 by the cartridge ejection lever 302, so that the disc cartridges 220 or 221 may be taken out of the cartridge holder 3. With the disc cartridges 220 or 221 thus extracted from the cartridge holder 3, the shutter member 206 or 217 is thrust and biased by the shutter closure spring 135 for closing the apertures 222 or 223 of the cartridge main body 205 or 216.

What is claimed is:

1. A recording and/or reproducing apparatus for a recording medium comprising:

a main body, a recording and/or reproducing unit freely movably mounted on said main body via plural damper units to allow fine movement of said recording and reproducing unit relative to said main body, a holder rotatably mounted to said recording and/or reproducing unit between a loading position and an unloading position, a rotary member rotatably mounted on the main body of the apparatus between a closed position for covering said recording and/or reproducing unit and an open position for exposing said recording and/or reproducing unit, and an engagement member rotatably mounted on an inner surface of the rotary member for engaging with said holder, wherein when said rotary member is rotated to said open position, said engagement member engages said holder and rotates said holder to said unloading position, and when said rotary member is rotated to said closed position, said engagement member rotates said holder to said loading position, wherein when said rotary member is in said closed position and said holder contacts said engagement member due to said fine movement between said recording and reproducing unit and said main body, said holder causes said engagement member to rotate relative to said rotary member such that the rotation of said engagement member permits said fine movement.

2. The recording and/or reproducing apparatus for a recording medium as claimed in claim 1 further comprising:

a biasing member for biasing said engagement member in a direction to engage said holder.

3. The recording and/or reproducing apparatus for a recording medium as claimed in claim 2 wherein said engagement member has a proximal end and a free distal end, an engagement portion is formed at said free distal end that protrudes towards said holder for engaging with said holder, said proximal end being rotatably mounted on said rotary member such that said engagement portion is in a state of being biased by said biasing member in the engagement direction.

4. A recording and/or reproducing apparatus for a recording medium comprising:

a main body, a recording and/or reproducing unit finely movably mounted on said main body via plural damper units to allow free movement of said recording and reproducing unit relative to said main body, a holder rotatably mounted to said recording and/or reproducing unit between a loading position and an unloading position, a rotary member rotatably mounted on the main body of the apparatus between a closed position for covering said recording and/or reproducing unit and an open position for exposing said recording and/or reproducing unit, an engagement member rotatably mounted on an inner surface of the rotary member for engaging with said holder, wherein when said rotary member is rotated to said open position, said engagement member engages said holder and rotates said holder to said unloading position, and when said rotary member is rotated to said closed position, said engagement member rotates said holder to said loading position, and a biasing member for biasing said engagement member in a direction to engage said holder, wherein when said rotary member is in said closed position and said holder contacts said engagement member due to said free movement between said recording and reproducing unit and said main body, said holder causes said engagement member to rotate relative to said rotary member, and wherein said engagement member has a proximal end and a free distal end, an engagement portion is formed at said free distal end that protrudes towards said holder for engaging with said holder, said proximal end being rotatably mounted on said rotary member such that said engagement portion is in a state of being biased by said biasing member in the engagement direction.

* * * * *

UNITED STATES PATENT AND TRADEMARK OFFICE
CERTIFICATE OF CORRECTION

PATENT NO. : 5,642,344
DATED : June 24, 1997
INVENTOR(S) : TOMOHIRO YAMADA ET AL.

It is certified that error appears in the above-indentified patent and that said Letters Patent is hereby corrected as shown below:

In Col. 29, line 20, please change "freely" to --finely--.
In Col. 30, line 39, please change "free" to --fine--.

Signed and Sealed this

Nineteenth Day of August, 1997

*Attest:*

BRUCE LEHMAN

*Attesting Officer*     Commissioner of Patents and Trademarks